United States Patent
Goi

(10) Patent No.: US 9,744,779 B2
(45) Date of Patent: Aug. 29, 2017

(54) ACTIVE-LIGHT-RAY-CURABLE INKJET WHITE INK AND IMAGE FORMING METHOD

(71) Applicant: Konica Minolta, Inc., Chiyoda-ku, Tokyo (JP)

(72) Inventor: Katsunori Goi, Kanagawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/302,314

(22) PCT Filed: Apr. 7, 2015

(86) PCT No.: PCT/JP2015/060793
§ 371 (c)(1),
(2) Date: Oct. 6, 2016

(87) PCT Pub. No.: WO2015/156267
PCT Pub. Date: Oct. 15, 2015

(65) Prior Publication Data
US 2017/0021641 A1   Jan. 26, 2017

(30) Foreign Application Priority Data
Apr. 10, 2014   (JP) .................................. 2014-080972

(51) Int. Cl.
*B41J 2/01*   (2006.01)
*B41J 11/00*   (2006.01)
(Continued)

(52) U.S. Cl.
CPC ............... *B41J 11/002* (2013.01); *B41J 2/01* (2013.01); *C09D 11/101* (2013.01);
(Continued)

(58) Field of Classification Search
CPC ........ B41J 2/2107; B41J 2/211; B41J 11/002; B41J 2/01; B41J 2/2117; B41J 2/2146;
(Continued)

(56) References Cited

U.S. PATENT DOCUMENTS

2009/0038506 A1*   2/2009   Odell ................... C09D 11/101
106/31.13

FOREIGN PATENT DOCUMENTS

| JO | 2007063553 A | 3/2007 |
| JP | H01275667 A | 11/1989 |

(Continued)

OTHER PUBLICATIONS

International Search Report corresponding to Application No. PCT/JP2015/060793; Date of Mailing: Jul. 14, 2015, with English translation.

*Primary Examiner* — Jannelle M Lebron
(74) *Attorney, Agent, or Firm* — Cantor Colburn LLP

(57) ABSTRACT

Through the active-light-ray-curable inkjet white ink according to the present invention, the ink including a pigment, a dispersing agent, a wax, a photopolymerizable compound, and a photopolymerization initiator, and being capable of a sol-gel phase transition by a temperature change, the pigment including titanium dioxide surface-coated with alumina, the content of the titanium dioxide being 10% by mass to 15% by mass of the total mass of the ink, the ink including sodium ions in a mass ratio of 200 ppm or lower with respect to the pigment, and the dispersing agent including a comb-shaped block copolymer having a tertiary amine group, even when titanium dioxide is used as the pigment, the viscosity of the ink can be restrained from increasing, luster equivalent to that of another color is obtained, and clogging of a recording head for ink discharge is reduced.

10 Claims, 5 Drawing Sheets

(51) Int. Cl.
*C09D 11/326* (2014.01)
*C09D 11/101* (2014.01)
*C09D 11/107* (2014.01)
*C09D 11/322* (2014.01)
*B41J 2/21* (2006.01)

(52) U.S. Cl.
CPC .......... *C09D 11/107* (2013.01); *C09D 11/322* (2013.01); *C09D 11/326* (2013.01); *B41J 2/2117* (2013.01); *B41J 2/2146* (2013.01)

(58) Field of Classification Search
CPC ..... C09D 11/101; C09D 11/30; C09D 11/322; C09D 11/107; C09D 11/326
USPC ..................................... 347/95, 96, 100, 102
See application file for complete search history.

(56) References Cited

FOREIGN PATENT DOCUMENTS

| | | | |
|---|---|---|---|
| JP | 2008308692 | A | 12/2008 |
| JP | 2009041015 | A | 2/2009 |
| JP | 4765256 | B2 | 9/2011 |
| JP | 2012219203 | A | 11/2012 |
| JP | 2013064092 | A * | 4/2013 |
| JP | 2013121992 | A | 6/2013 |

* cited by examiner

ACTIVE-LIGHT-RAY-CURABLE INKJET WHITE INK AND IMAGE FORMING METHOD

This is the U.S. national stage of application No. PCT/JP2015/060793, filed on Apr. 7, 2015. Priority under 35 U.S.C. §119(a) and 35 U.S.C. §365(b) is claimed from Japanese Application No. 2014-080972, filed Apr. 10, 2014, the disclosure of which is also incorporated herein by reference.

TECHNICAL FIELD

The present invention relates to an actinic radiation-curable inkjet white ink and an image forming method.

BACKGROUND ART

From the viewpoint of simple and inexpensive image production, inkjet recording has been used in a variety of printing fields. As the inkjet recording method, there is an actinic radiation-curable inkjet method in which droplets of UV-curable ink are landed on a recording medium and then the ink is cured by irradiation with actinic radiation to form an image. Recently, the actinic radiation-curable inkjet method has been attracting attention because it provides high adhesiveness even when being applied on recording media which lack ink absorbing properties or when being applied on another ink for top coating.

In relation to an actinic radiation-curable inkjet ink, there is known a technique of allowing an actinic radiation-curable inkjet ink to contain a wax or a gelling agent in order to prevent inks from being unnecessarily mixed together and to further enhance the rub resistance of an image to be obtained. In this technique, the wax or the gelling agent enables sol-gel phase transition through a temperature change, and thus the ink undergoes gelation when being attached onto a recording medium so that the mixing of inks and the spreading of dots can be prevented. In addition, the viscosity of an ink can be increased even at low temperatures, which provides a printed article further having excellent rub resistance at room temperature.

PTL 1 and PTL 2 each describe an image forming method in which a color ink and a white ink are used in combination to produce a desired esthetic performance. In this case, use of an actinic radiation-curable inkjet ink capable of sol-gel phase transition through a temperature change for the white ink enables formation of an image in an easier manner. Further, a background color can be formed by using the white ink for top coating or primer coating in formation of an image with other inks.

For a colorant in a white ink, pigments such as titanium dioxide are used. Titanium dioxide is poor in light resistance as it is, and thus is used with the surface covered with alumina or the like. However, the high tendency of alumina to polarize makes it difficult for alumina to disperse stably in a non-polar solvent such as one to be used for an actinic radiation-curable inkjet ink, and the particles easily associate together. Accordingly, inks containing titanium dioxide as a pigment are allowed to contain a dispersant to enhance the dispersibility of the pigment for stable storage of the ink. PTL 3 describes, for example, an ink containing a white pigment such as titanium dioxide in which the pigment is dispersed in a dispersant containing a copolymer or block copolymer having a pigment-affinic group. As such dispersants, dispersants having a secondary amine as a pigment-affinic group are disclosed. As the gelling agent is used a free radical-curable gelling agent obtained by polymerization via amide bonds.

Alternatively, titanium dioxide can be used to inhibit the blooming of an ink. PTL 4 describes an actinic radiation-curable inkjet ink which is capable of gelation through a wax and contains, as an inorganic fine particle having a weak coloring ability, less than 5% of titanium dioxide relative to the mass of the ink.

CITATION LIST

Patent Literature

PTL 1
Japanese Patent Application Laid-Open No. 2007-63553
PTL 2
Japanese Patent No. 4765256
PTL 3
Japanese Patent Application Laid-Open No. 2009-41015
PTL 4
Japanese Patent Application Laid-Open No. 2013-121992

SUMMARY OF INVENTION

Technical Problem

Inkjet inks are heated to a temperature around 85° C. when being discharged. If the dispersant is then weakly adsorbed to the pigment, the pigment is detached from the dispersant to cause the reagglomeration of the pigment, which increases the viscosity of the ink. The increased viscosity of the ink results in high tendency to cause discharge failure and clogging of a recording head for ink discharge.

On the surface of titanium dioxide surface-coated with alumina, a sodium ion used in surface-coating remains, and the gelation of the ink may be interrupted by the interaction between the sodium ion and a gelling agent or a wax contained in the ink. If the gelation of the ink is interrupted, the ink spreads without undergoing sufficient pinning, and thus the surface of the ink landed on a recording medium is excessively smoothed to impart excessive glossiness to the ink, which may generate a glossiness difference from other colors. Particularly in the case where a white ink is used for top coating or primer coating (background), the generation of a glossiness difference from other colors used for formation of an image may deteriorate the esthetic performance of an image. In addition, a metal salt is formed from the sodium ion derived from titanium dioxide and a fatty acid residue contained in a gelling agent or a wax, and a precipitate of the metal salt may cause clogging of a recording head for ink discharge.

Thus, an object of the present invention is to provide: an actinic radiation-curable inkjet white ink capable of sol-gel phase transition through a temperature change which can prevent the increase of the viscosity of the ink, has glossiness comparable to different-colored inks to be used for formation of an image, and is less likely to cause clogging of a recording head for ink discharge, even in the case where titanium dioxide is used as a pigment; and an image forming method using the ink.

Solution to Problem

The present invention relates to an actinic radiation-curable inkjet white ink below.

[1] An actinic radiation-curable inkjet white ink capable of sol-gel phase transition through a temperature change, comprising a pigment, a dispersant, a wax, a photocurable compound, and a photopolymerization initiator, wherein the pigment comprises titanium dioxide surface-coated with alumina, a content of the titanium dioxide is 10 mass % or more and 15 mass % or less relative to a total mass of the ink, the ink comprises a sodium ion at a mass fraction of 200 ppm or less relative to a mass of the pigment, and the dispersant comprises a comb-shaped block copolymer having a tertiary amine group.

[2] The ink according to [1], wherein a content of the block copolymer is 2.0 mass % or more and 8.0 mass % or less relative to the total mass of the ink.

[3] The ink according to [1] or [2], wherein the wax comprises an aliphatic ketone and a fatty acid ester.

[4] The ink according to [3], wherein a sum total of a content of the aliphatic ketone and a content of the fatty acid ester is 2.0 mass % or more and 5.0 mass % or less relative to the total mass of the ink.

[5] The ink according to [3] or [4], wherein a content of the aliphatic ketone is equal to or more than a content of the fatty acid ester.

The present invention also relates to an image forming method below.

[6] An image forming method comprising: attaching the actinic radiation-curable inkjet white ink according to any one of [1] to [5] onto a recording medium through discharge from a recording head for ink discharge; and irradiating the attached actinic radiation-curable inkjet white ink with actinic radiation.

[7] The image forming method according to [6], further comprising: attaching one or more color ink(s) onto the recording medium; and fixing the attached color ink(s).

[8] The method according to [7], wherein the attaching the actinic radiation-curable inkjet white ink onto the recording medium is performed after the attaching the color ink(s) onto the recording medium.

[9] The method according to [7], wherein the attaching the color ink(s) onto the recording medium is performed after the attaching the actinic radiation-curable inkjet white ink onto the recording medium.

[10] The method according to any one of [7] to [9], wherein the color ink(s) is or are each an actinic radiation-curable ink comprising a photocurable compound and a photopolymerization initiator, the fixing the attached color ink(s) corresponds to irradiating the attached color ink(s) with actinic radiation, and the irradiating the attached color ink(s) with actinic radiation and the irradiating the attached actinic radiation-curable inkjet white ink with actinic radiation are performed by one irradiation with actinic radiation.

Advantageous Effects of Invention

The present invention can provide: an actinic radiation-curable inkjet white ink capable of sol-gel phase transition through a temperature change which can prevent the increase of the viscosity of the ink, has glossiness comparable to different-colored inks, and is less likely to cause clogging of a recording head for ink discharge, even in the case where titanium dioxide is used as a pigment; and an image forming method using the ink.

DESCRIPTION OF EMBODIMENTS

1. Actinic Radiation-Curable Inkjet White Ink

Figure 1A:
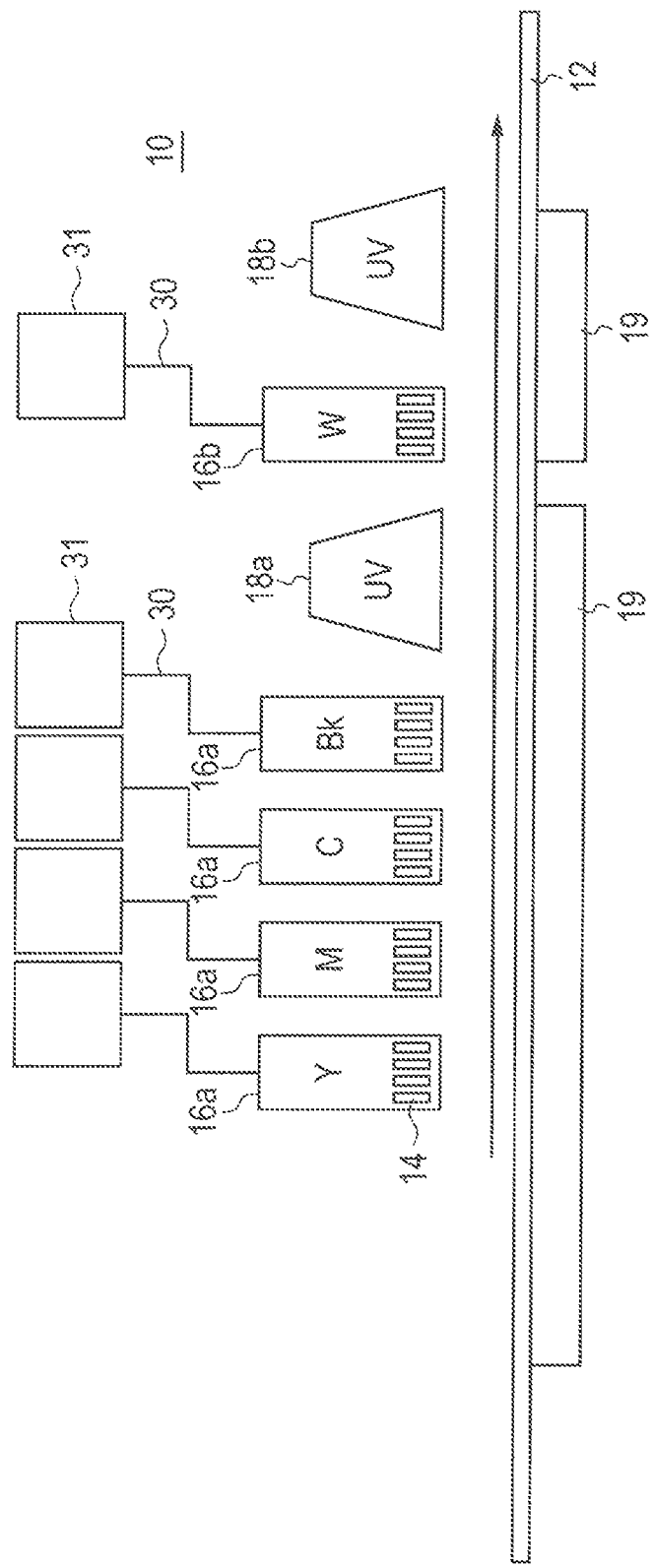
FIG. 1A is a side view illustrating one example of the configuration of the main part of an inkjet recording apparatus of line recording type which can be used for formation of an image according to one aspect of the present invention.

The ink according to one aspect of the present invention is an actinic radiation-curable inkjet white ink (hereinafter, also referred to as the white ink, simply) containing a pigment, a dispersant, a wax, a photocurable compound, and a photopolymerization initiator, in which the pigment contains titanium dioxide surface-coated with alumina, the ink contains the titanium dioxide at a content of 10 mass % or more and 15 mass % or less relative to the total mass of the ink, the ink contains a sodium ion at a mass fraction of 200 ppm or less, and the dispersant contains a comb-shaped block copolymer having a tertiary amine group.

Hereinafter, the ink according to one aspect of the present invention is described through detailed description of each component.

[Pigment]

The actinic radiation-curable inkjet white ink according to one aspect of the present invention contains a pigment. The pigment contains titanium dioxide surface-coated with alumina. The actinic radiation-curable inkjet white ink according to one aspect of the present invention contains the titanium dioxide surface-coated with alumina at a content of 10 mass % or more and 15 mass % or less.

Examples of the crystalline forms of titanium dioxide include rutile type, anatase type, and brookite type. Anatase type is preferred from the viewpoint of small specific gravity and easiness in achieving small particle size, and rutile type is preferred from the viewpoint of high refractivity and high masking ability. Titanium oxides having different crystalline forms may be used in combination.

The weight average particle size of titanium dioxide is preferably 50 nm or larger and 500 nm or smaller, and more preferably 100 nm or larger and 300 nm or smaller. Controlling the weight average particle size of titanium dioxide to 50 nm or larger provides an ink having sufficient masking ability. On the other hand, controlling the weight average particle size of titanium dioxide to 500 nm or smaller enables stable dispersion of titanium dioxide, which enhances the storage properties and ejection stability of the ink.

For surface-coating of titanium dioxide with alumina, known methods described in Japanese Patent No. 3546064, Japanese Patent No. 2833820, etc. can be used. For example, surface-coating of titanium dioxide with alumina can be carried out in accordance with the following procedure:

1) titanium oxide is dispersed in water to produce a slurry;
2) the temperature of the slurry obtained in 1) is adjusted to a predetermined temperature, and a soluble aluminum compound (sodium aluminate) as a surface-treating agent is added to dissolve therein; and
3) while the pH of the slurry obtained in 2) is maintained within a predetermined range, an acid precipitant is added thereto for neutralization to deposit an aluminum hydrate.

In the present invention, a commercially available product of titanium dioxide may be used. Preferred examples of the commercially available product of titanium dioxide which can be used in the present invention include CR-EL (ISIHARA SANGYO KAISHA, LTD.), CR-50 (ISIHARA SANGYO KAISHA, LTD.), CR-80 (ISIHARA SANGYO KAISHA, LTD.), CR-90 (ISIHARA SANGYO KAISHA, LTD.), R-780 (ISIHARA SANGYO KAISHA, LTD.), R-930 (ISIHARA SANGYO KAISHA, LTD.), TCR-52 (Sakai Chemical Industry Co., Ltd.), R-310 (Sakai Chemical Industry Co., Ltd.), R-32 (Sakai Chemical Industry Co., Ltd.), KR-310 (Titan Kogyo, Ltd.), KR-380 (Titan Kogyo, Ltd.), and KR-380N (Titan Kogyo, Ltd.).

A sodium ion ($Na^+$), a residual ion of sodium aluminate, may remain on titanium dioxide surface-coated with alumina. If a large amount of the sodium ion which is present on the surface of titanium dioxide or is detached from the surface of titanium dioxide is contained in the ink, the wax undergoes insufficient gelation due to the interaction between the sodium ion and the wax in the inkjet ink, resulting in insufficient pinning, which may increase the droplet size and cause the generation of excessive glossiness. If a metal salt is formed from the sodium ion and a fatty acid or the like contained in the wax and precipitates, the precipitate may cause clogging of a recording head for ink discharge. Accordingly, it is preferred in the present invention to remove the sodium ion remaining on titanium dioxide before preparation of the ink. The sodium ion remaining on titanium dioxide can be removed by using a method of fatty acid treatment, water washing, combination of water washing and ultrasound washing, or the like.

During storage of the ink, for example, the sodium ion released from the pigment into the ink may form a metal salt with the fatty acid. In view of this, the sodium ion content of the actinic radiation-curable inkjet white ink according to one aspect of the present invention is controlled to 200 ppm or less in a mass fraction relative to the mass of the pigment. In the present invention, the sodium ion content of the ink refers to the amount of the sodium ion present on the surface of titanium dioxide or the amount of the sodium ion present in a free state in the ink. In most situations, the amount of the sodium ion derived from substances other than titanium dioxide in the ink is negligible. Thus, if the amount of the sodium ion remaining on titanium dioxide used for the ink according to one aspect of the present invention is measurable, the measurement may be regarded as the sodium ion content of the ink. In the present invention, a commercially available product of titanium dioxide having, for example, a sodium ion content of 200 ppm or less may be used, or the residual sodium ion content may be controlled to 200 ppm by subjecting a commercially available product of titanium dioxide to the above removal treatment. Controlling the sodium ion content to 200 ppm or less can prevent insufficient gelation of the wax due to the interaction between the sodium ion and the wax, and further enables inhibition of the precipitation of a metal salt formed through a bond between the sodium ion and a fatty acid residue to prevent clogging of a recording head for ink discharge.

The sodium ion content of the ink can be measured, for example, in accordance with the following procedure:

1) methanol is added to the ink to produce a solution, which is then placed in a centrifuge tube and centrifuged to separate into a solid and a solution in a centrifuge at 20,000 rpm for 1 hour;
2) the solid after being dried is decomposed to convert into a solution with a mixed acid of concentrated nitric acid/concentrated hydrochloric acid (mole ratio: 1/10) in a closed microwave digestion apparatus;
3) the sodium ion content of the concentrated nitric acid/concentrated hydrochloric acid solution obtained in 2) is measured by using ICP-AES (SPS3520UV, manufactured by Seiko Instruments Inc.) to determine the sodium ion content of the solid component;
4) in the same manner, the sodium ion content of the solution obtained in 1) is measured by using the ICP-AES to determine the sodium ion content of the solution component; and
5) the sodium ion content of the solid component determined in 3) and the sodium ion content of the solution component determined in 4) are added together, and the resultant is used as "the sodium ion content of the ink".

The residual sodium ion content of titanium dioxide can be measured, for example, in accordance with the following procedure:

1) a surface-treated titanium dioxide power is decomposed to convert into a solution with a mixed acid of concentrated nitric acid/concentrated hydrochloric acid (mole ratio: 1/10) in a closed microwave digestion apparatus; and
2) the sodium ion content of the concentrated nitric acid/concentrated hydrochloric acid solution obtained in 1) is measured by using ICP-AES (SPS3520UV, manufactured by Seiko Instruments Inc.).

The amount of surface treatment (amount of surface coating) with alumina is preferably 0.3 mass % or more and 0.8 mass % or less, and more preferably 0.5 mass % or more and 0.7 mass % or less relative to the mass of untreated titanium oxide. Controlling the amount of surface treatment to 0.3 mass % or more allows the cured film of the ink to have weather resistance. On the other hand, controlling the amount of surface treatment to 0.8 mass % or less facilitates reduction of the residual sodium ion content to a preferred range.

The amount of surface treatment on surface-treated titanium oxide can be measured in accordance with the following procedure:

1) a surface-treated titanium oxide powder is decomposed to convert into a solution with an aqueous solution of hydrofluoric acid in a closed microwave digestion apparatus; and
2) the Al content of the aqueous solution obtained is measured by using ICP-AES.

In the present invention, titanium dioxide surface-coated with alumina may have been surface-treated with combination of alumina and another metal oxide.

The actinic radiation-curable inkjet white ink according to one aspect of the present invention contains titanium dioxide surface-coated with alumina at a content of 10 mass % or more and 15 mass % or less relative to the total mass of the ink. Controlling the content of titanium dioxide surface-coated with alumina to 10 mass % or more provides sufficient white color exhibition. Controlling the content of titanium dioxide surface-coated with alumina to 15 mass % or less can prevent clogging of a recording head for ink discharge caused by titanium dioxide to enhance ability of ejection.

The actinic radiation-curable inkjet white ink according to one aspect of the present invention may contain a known white pigment other than titanium dioxide surface-coated with alumina. Examples of the known white pigment include inorganic white pigments, organic white pigments, and white hollow polymer fine particles.

Further, the actinic radiation-curable inkjet white ink according to one aspect of the present invention may contain a dye or a non-white pigment for adjustment of color tone.

Dispersing of the pigment can be performed by using ball mill, sand mill, attritor, roll mill, agitator, HENSCHEL MIXER, colloid mill, ultrasound homogenizer, pearl mill, wet jet mill, or paint shaker, for example.

The actinic radiation-curable inkjet white ink according to one aspect of the present invention may further contain at least one of an UV absorber and an antioxidant to enhance the weather resistance of the cured product.

The longest absorption wavelength of the UV absorber is preferably 410 nm or shorter from the viewpoint of light resistance and ozone resistance. The absorption wavelength of the UV absorber can be determined by measuring the UV-visible absorption spectrum. The content of the UV absorber is preferably 2 mass % or less, more preferably 1 mass % or less, and even more preferably 0.5 mass % or less relative to the total mass of the ink. If the content of the UV absorber is excessively high, lowering of curability or coloring of the cured product may be caused. On the other hand, the content of the UV absorber is preferably 0.1 mass % or more to lower the photocatalytic action of an inorganic white pigment sufficiently through absorption of ultraviolet rays irradiated.

The content of the antioxidant is preferably 0.8 mass % or less, and more preferably 0.5 mass % or less relative to the total mass of the ink. If the content of the antioxidant is excessively high, lowering of curability may be caused. On the other hand, the content of the antioxidant is preferably 0.05 mass % or more to inhibit the oxidation of a resin, etc., sufficiently through scavenging a radical generated in the cured film of the ink.

The total amount of the UV absorber and the antioxidant is preferably 2.0 mass % or less, and more preferably 1.0 mass % or less relative to the total mass of the ink. If the total amount of the UV absorber and the antioxidant is more than 2.0 mass %, the viscosity of the ink is increased, and lowering of ejection stability or lowering of curability may be caused.

[Dispersant]

The actinic radiation-curable inkjet white ink according to one aspect of the present invention contains a dispersant. The dispersant contained in the ink enables enhancement of the dispersibility of the pigment. In the present invention, the dispersant contains a comb-shaped block copolymer having a tertiary amine group (hereinafter, also referred to as "the copolymer according to one aspect of the present invention", simply). In the present invention, the comb-shaped block copolymer refers to a copolymer in which a straight-chain polymer forms the main chain and a different polymer is graft-polymerized as a side chain onto each monomer unit constituting the main chain.

The content of the copolymer according to one aspect of the present invention is not limited, but is preferably 2.0 mass % or more and 8.0 mass % or less relative to the total mass of the ink. Controlling the content of the copolymer according to one aspect of the present invention to 2.0 mass % or more enables further enhancement of the dispersibility of the pigment through the steric hindrance effect of the dispersant. Controlling the content of the copolymer according to one aspect of the present invention to 8.0 mass % or less can prevent the increase of the viscosity due to entangling of the copolymer, and as a result clogging of a recording head for ink discharge can be prevented. The content of the copolymer according to one aspect of the present invention is preferably 2.0 mass % or more and 5.0 mass % or less relative to the total mass of the ink.

The copolymer according to one aspect of the present invention has a tertiary amine group, and this configuration increases the electron density of the amine, which is a functional group having adsorbing properties to the pigment, to provide strong basicity, which enables strong adsorption to an acidic group on the surface of the pigment. Accordingly, the copolymer according to one aspect of the present invention is less likely to be detached from the pigment even at a temperature around 85° C., at which an inkjet ink is ejected. Moreover, use of a copolymer having a tertiary amine group in the main chain for the copolymer according to one aspect of the present invention allows the side chain to be compatible with a photocurable compound to be described later, which facilitates dispersion of the dispersant itself and the dispersibility of the pigment on which the dispersant is adsorbed can be also enhanced.

A substituent of the amine is not particularly limited, but is preferably a $C_1$ or $C_2$ alkyl group or the like.

The type of the copolymer according to one aspect of the present invention is not particularly limited as long as the dispersant satisfies the above conditions. Preferred examples of such dispersants include BYK-2164, BYK-168, and BYK N-22024 each manufactured by BYK-Chemie GmbH; BYK JET-9150 and BYK JET-9151 each manufactured by ALTANA AG; EFKA 4310, EFKA 4320, and EFKA 4401 each manufactured by BASF SE; SOLSPERSE 39000 manufactured by Avecia Biotechnology, Inc.; and AJISPER PB-821 manufactured by Ajinomoto Fine-Techno Co., Inc.

For a comb-shaped block copolymer having a secondary or primary amine group, a hydrogen atom(s) of the amine group may be substituted with another substituent to convert into a tertiary amine group by using a known method. For example, a secondary or primary amine group of a comb-shaped block copolymer can be reacted with an alcohol such as decyl alcohol in the presence of a reduction catalyst to convert into a tertiary amine group substituted with alkyl groups.

The white ink according to one aspect of the present invention may contain, in addition to the copolymer according to one aspect of the present invention, a dispersant such as hydroxyl group-containing carboxylic acid esters, salts of long chain polyaminoamides and high molecular weight acid esters, salts of high molecular weight polycarboxylic acids, salts of long chain polyaminoamides and polar acid esters, high molecular weight unsaturated acid esters, high molecular weight copolymers, modified polyurethane, modified polyacrylate, anionic surfactants of polyether ester type, naphthalenesulfonic acid-formalin condensate salts, aromatic sulfonic acid-formalin condensate salts, polyoxyethylene alkyl phosphoric acid esters, polyoxyethylene nonyl phenyl ether, and stearylamine acetate. Examples of commercially available products of the dispersant include SOLSPERSE series of Avecia Biotechnology, Inc., and PB series of Ajinomoto Fine-Techno Co., Inc.

If necessary, the actinic radiation-curable inkjet white ink according to one aspect of the present invention may further contain a dispersion promoter. The dispersion promoter can be selected according to the pigment. If necessary, the actinic radiation-curable inkjet white ink according to one aspect of the present invention may further contain a dispersion medium for dispersing the pigment. A solvent may be contained as the dispersion medium in the ink. However, for preventing the solvent from remaining in a formed image, it is preferable that the dispersion medium should be any of the photocurable compounds to be described later.

[Wax]

The actinic radiation-curable inkjet white ink according to one aspect of the present invention contains a wax. In the present invention, the wax is defined as "organic substance which is solid at normal temperature and liquefies when being heated". The actinic radiation-curable inkjet white ink according to one aspect of the present invention preferably contains the wax at a content of 1.2 mass % or more and less than 5.5 mass % relative to the total mass of the ink. Controlling the content of the wax to 1.2 mass % or more enables enhancement of slippage on the surface of an image, which provides an image with satisfactory rubfastness. Controlling the content of the wax to 5.5 mass % or less can prevent the generation of excessive glossiness due to the wax precipitated on the surface of an image, and enables enhancement of the ability of ink ejection from an inkjet head.

The type of the wax is not particularly limited, and examples thereof include higher fatty acids, higher alcohols, fatty acid esters, triglycerides, fatty acid amines, aliphatic ketones, and fatty acid amides.

In the present invention, the wax has a function of causing the ink to undergo temperature-induced reversible sol-gel phase transition. The wax can be suitably dissolved in a photocurable compound at a temperature higher than the gelling temperature, and crystallized in the ink at a temperature equal to or lower than the gelation temperature.

When the wax is crystallized in an ink, it is preferable that a space three-dimensionally surrounded by plate-like crystals, a crystallization product of the wax, is formed so that the actinic radiation-curable compound is included in that space. Such a structure in which an actinic radiation-curable compound is included in a space three-dimensionally surrounded by plate-like crystals can be referred to as a "card house structure." Once a card house structure is formed, the liquid actinic radiation-curable compound can be maintained therein and ink droplets can be pinned. Accordingly, combining of liquid droplets can be prevented, and the generation of excessive glossiness due to a smoothed ink can be prevented. It is preferable that the actinic radiation-curable compound and the wax dissolving in the ink are compatible with each other to form the card house structure. In contrast to this, if phase separation between the actinic radiation-curable compound and the wax dissolving in the ink occurs, the card house structure may be difficult to form.

Preferred examples of the wax include: aliphatic ketone compounds such as 18-pentatriacontanone and 16-hentriacontanone (e.g., KAO Wax T1 manufactured by Kao Corporation); aliphatic monoester compounds such as cetyl palmitate, stearyl stearate, and behenyl behenate (e.g., UNISTAR M-2222SL (manufactured by NOF Corporation), EXCEPARL SS (manufactured by Kao Corporation, melting point: 60° C.), EMALEX CC-18 (manufactured by Nihon Emulsion Co., Ltd.), AMREPS PC (manufactured by Kokyu Alcohol Kogyo Co., Ltd.), EXCEPARL MY-M (manufactured by Kao Corporation), SPERMACETI (manufactured by NOF Corporation), and EMALEX CC-10 (manufactured by Nihon Emulsion Co., Ltd.); amide compounds such as N-lauroyl-L-glutamic acid dibutylamide and N-(2-ethylhexanoyl)-L-glutamic acid dibutylamide (available from Ajinomoto Fine-Techno Co., Inc.); dibenzylidene sorbitols such as 1,3:2,4-bis-O-benzylidene-D-glucitol (available from New Japan Chemical Co., Ltd. as GELOL D); petroleum waxes such as paraffin wax, microcrystalline wax, and petrolatum; plant-derived waxes such as candelilla wax, carnauba wax, rice wax, sumac wax, jojoba oil, solid jojoba wax, and jojoba ester; animal-derived waxes such as beeswax, lanolin, and spermaceti; mineral waxes such as montan wax and hydrogenated wax; hydrogenated castor oil or hydrogenated castor oil derivatives; modified waxes such as montan wax derivatives, paraffin wax derivatives, microcrystalline wax derivatives, or polyethylene wax derivatives; higher fatty acids such as behenic acid, arachidic acid, stearic acid, palmitic acid, myristic acid, lauric acid, oleic acid, and erucic acid; higher alcohols such as stearyl alcohol and behenyl alcohol; hydroxystearic acids such as 12-hydroxystearic acid; 12-hydroxystearic acid derivatives; fatty acid amides such as lauric acid amide, stearic acid amide, behenic acid amide, oleic acid amide, erucic acid amide, ricinoleic acid amide, and 12-hydroxystearic acid amide (e.g., NIKKA AMIDE series manufactured by Nippon Kasei Chemical Co., Ltd., ITOWAX series manufactured by Itch Oil Chemicals Co., Ltd., and FATTY AMID series manufactured by Kao Corporation); N-substituted fatty acid amides such as N-stearyl stearic acid amide and N-oleyl palmitic acid amide; specialty fatty acid amides such as N,N'-ethylene bisstearylamide, N,N'-ethylene bis-12-hydroxystearylamide, and N,N'-xylylene bisstearylamide; higher amines such as dodecylamine, tetradecylamine, or octadecylamine; fatty acid ester compounds such as stearyl stearic acid, oleyl palmitic acid, glycerin fatty acid ester, sorbitan fatty acid ester, propylene glycol fatty acid ester, ethylene glycol fatty acid ester, and polyoxyethylene fatty acid ester (e.g., EMALLEX series manufactured by Nihon Emulsion Co., Ltd., RIKEMAL series manufactured by Riken Vitamin Co., Ltd., and POEM series manufactured by Riken Vitamin Co., Ltd.); esters of sucrose fatty acids such as sucrose stearic acid and sucrose palmitic acid (e.g., RYOTO Sugar Ester series manufactured by Mitsubishi-Kagaku Foods Corporation); synthetic waxes such as polyethylene wax and α-olefin-malic anhydride copolymer wax; polymerizable wax (UNILIN series manufactured by Baker-Petrolite, etc.); dimeric acids; and dimer diols (PRIPOR series manufactured by CRODA International Plc, etc.).

These waxes may be used either singly, or in combination.

In the present invention, an aliphatic ketone and a fatty acid ester may be used in combination for the wax. In the actinic radiation-curable inkjet white ink according to one aspect of the present invention, the wax is attracted to polarized alumina, and the wax may undergo insufficient gelation. If the gelation of the wax is insufficient, the ink droplet tends to spread due to insufficient pinning of the ink, and the surface of the ink may be excessively smoothed to generate excessive glossiness. In contrast, an aliphatic ketone has less tendency to be attracted to alumina, and thus use of an aliphatic ketone for the wax allows the ink to undergo satisfactory gelation, and the ink droplet is less likely to spread. Use of a fatty acid ester, which has a large gelling effect even in a small amount, in combination with an aliphatic ketone allows the ink to undergo sufficient gelation, and provides satisfactory pinning properties and glossiness comparable to other colors.

The sum total of the content of an aliphatic ketone and the content of a fatty acid ester relative to the total mass of the actinic radiation-curable inkjet white ink according to one aspect of the present invention is preferably 2.0 mass % or more and 5.0 mass % or less. Controlling the sum total of the contents of these waxes to 2.0 mass % or more allows the ink to undergo sufficient sol-gel phase transition, and thus the increase of dot size can be prevented and the glossiness can be adjusted to be comparable to other inks. Controlling the sum total of the contents of these waxes to 5.0 mass % or less can prevent the increase of the viscosity due to an excessive amount of the waxes. From the viewpoint of further enhancement of pinning properties and obtaining glossiness comparable to other colors, the content of the aliphatic ketone is preferably equal to or more than the content of the fatty acid ester in the actinic radiation-curable inkjet white ink according to one aspect of the present invention.

The aliphatic ketone as the wax is, for example, represented by Formula (1).

[Formula 1]

$$R1\text{-}(C\!=\!O)\text{-}R2 \qquad (1)$$

In Formula (1), R1 and R2 each independently represent an aliphatic hydrocarbon group containing a straight-chain moiety having 9 or more and 25 or less carbon atoms. In Formula (1), the aliphatic hydrocarbon group R1 suitably has almost the same number of carbon atoms as the aliphatic hydrocarbon group R2. Each of the aliphatic hydrocarbon groups may be a saturated or unsaturated aliphatic hydrocarbon group, but is preferably a saturated aliphatic hydrocarbon group (alkylene group) from the viewpoint of, for example, raising the gelation temperature of the ink. This is because the melting point of a compound in which R1 and R2 are each a saturated aliphatic hydrocarbon group in Formula (1) is often higher than that of a compound in which R1 and R2 are each an unsaturated aliphatic hydrocarbon group in Formula (1), and thus the gelation temperature of the ink in the former case tends to be higher than that in the latter case. The saturated aliphatic hydrocarbon group may be an aliphatic hydrocarbon group optionally having a branched moiety, but is preferably a saturated aliphatic hydrocarbon group having no branched moiety (straight-chain alkylene group) to obtain high crystallinity.

The straight-chain moiety contained in each of R1 and R2 in Formula (1) preferably has 9 or more and 25 or less carbon atoms. If the straight-chain moiety contained in each of the aliphatic hydrocarbon groups has 9 or more carbon atoms, the wax has sufficient crystallinity and sufficient space for enclosing therein the actinic radiation-curable compound tends to be formed in the above-mentioned card house structure. On the other hand, if the straight-chain moiety contained in each of the aliphatic hydrocarbon groups has 25 or less carbon atoms, the melting point is not excessively high and thus the wax is highly soluble in the ink even at a typical ejection temperature of the ink from a recording head for ink discharge. The straight-chain moiety contained in each of the aliphatic hydrocarbon groups R1 and R2 preferably has 11 or more and less than 23 carbon atoms. Accordingly, each of R1 and R2 is particularly preferably a straight-chain saturated aliphatic hydrocarbon group (straight-chain alkylene group) having 11 or more and less than 23 carbon atoms.

Examples of the aliphatic hydrocarbon group containing a straight-chain moiety having 9 or more and 25 or less carbon atoms include a docosanyl group (C22), an icosanyl group (C20), an octadecanyl group (C18), a heptadecanyl group (C17), a hexadecanyl group (C16), a pentadecanyl group (C15), a tetradecanyl group (C14), a tridecanyl group (C13), a dodecanyl group (C12), an undecanyl group (C11), and a decanyl group (C10).

The fatty acid ester as the wax is, for example, represented by Formula (2).

[Formula 2]

$$R3\text{-}(C\!=\!O)\text{-}O\text{-}R4 \qquad (2)$$

In Formula (2), R3 and R4 each independently represent an aliphatic hydrocarbon group containing a straight-chain moiety having 9 or more and 26 or less carbon atoms. In Formula (2), the aliphatic hydrocarbon group R3 suitably has almost the same number of carbon atoms as the aliphatic hydrocarbon group R4. Each of the aliphatic hydrocarbon groups may be a saturated or unsaturated aliphatic hydrocarbon group, but is preferably a saturated aliphatic hydrocarbon group (alkylene group) from the viewpoint of, for example, raising the gelation temperature of the ink. This is because the melting point of a compound in which R3 and R4 are each a saturated aliphatic hydrocarbon group in Formula (2) is often higher than that of a compound in which R3 and R4 are each an unsaturated aliphatic hydrocarbon group in Formula (2), and thus the gelation temperature of the ink in the former case tends to be higher than that in the latter case. The saturated aliphatic hydrocarbon group may be an aliphatic hydrocarbon group optionally having a branched moiety, but is preferably a saturated aliphatic hydrocarbon group having no branched moiety (straight-chain alkylene group) to obtain high crystallinity.

The straight-chain moiety contained in each of R3 and R4 in Formula (2) preferably has 9 or more and 26 or less carbon atoms. If the straight-chain moiety contained in each of the aliphatic hydrocarbon groups has 9 or more carbon atoms, the wax has sufficient crystallinity and sufficient space for enclosing therein the actinic radiation-curable compound tends to be formed in the above-mentioned card house structure. On the other hand, if the straight-chain moiety contained in each of the aliphatic hydrocarbon groups has 26 or less carbon atoms, the melting point is not excessively high and thus the wax is highly soluble in the ink even at a typical ejection temperature of the ink from a recording head for ink discharge. To provide a compound represented by Formula (2) with crystallinity at a certain level or higher, it is preferable that the straight-chain moiety contained in the aliphatic hydrocarbon group R3 should have 11 or more and less than 23 carbon atoms and the straight-chain moiety contained in the aliphatic hydrocarbon group R4 should have 12 or more and less than 24 carbon atoms. Accordingly, it is particularly preferable that R3 should be a straight-chain alkylene group having 11 or more and less than 23 carbon atoms and R4 should be a straight-chain alkylene group having 12 or more and less than 24 carbon atoms.

Examples of the aliphatic hydrocarbon group containing a straight-chain moiety having 9 or more and 26 or less carbon atoms include those for the above-mentioned aliphatic hydrocarbon group containing a straight-chain moiety having 9 or more and 25 or less carbon atoms in Formula (1).

The ink according to one aspect of the present invention contains a predetermined amount of the wax. Thus, when the ink discharged from a recording head for ink discharge is attached onto a recording medium as ink droplets and cooled to a temperature lower than the gelation temperature, the ink quickly undergoes gelation. As a result, mixing of dots and combining of dots are prevented and high-quality image formation can be achieved in high-speed printing. Thereafter, the gelled ink droplets are fixed on the recording medium through curing by light irradiation, and a strong image film is thus formed.

The droplets of the ink according to one aspect of the present invention landed on a recording medium quickly undergo gelation and the ink droplets do not diffuse in the surface of the recording medium. Accordingly, it is less likely that oxygen present in the environment enters the ink droplets. Thus, the curing is less likely to be inhibited by oxygen.

[Photocurable Compound]

The actinic radiation-curable inkjet white ink according to one aspect of the present invention contains a photocurable compound.

The photocurable compound refers to a compound which undergoes crosslinking or polymerization by irradiation with actinic radiation. Examples of actinic radiation include electron beams, ultraviolet rays, α rays, γ rays, and X rays. Ultraviolet rays and electron beams are preferable, and ultraviolet rays are more preferable. The photocurable compound is a radical polymerizable compound or a cationic polymerizable compound, and is preferably a radical polymerizable compound.

The radical polymerizable compound is a compound (monomer, oligomer, polymer or mixture of these) which has an ethylenically unsaturated bond, which is radically polymerizable. In the actinic radiation-curable inkjet white ink, either single or two or more types of the radical polymerizable compound may be contained.

Examples of the compound having an ethylenically unsaturated bond, which is radically polymerizable, include an unsaturated carboxylic acid and a salt thereof, an unsaturated carboxylic ester compound, an unsaturated carboxylic urethane compound, an unsaturated carboxylic amide compound and an anhydride thereof, acrylonitrile, styrene, unsaturated polyester, unsaturated polyether, unsaturated polyamide, and unsaturated urethane. Examples of the unsaturated carboxylic acid include (meth)acrylic acid, itaconic acid, crotonic acid, isocrotonic acid, and maleic acid.

Among the foregoing, the radical polymerizable compound is preferably an unsaturated carboxylic ester compound and more preferably a (meth)acrylate compound. The (meth)acrylate compound described later may, in addition to a monomer, be an oligomer, a mixture of a monomer and an oligomer, a modified product, or an oligomer having a polymerizable functional group.

In the present specification, "(meth)acrylate" encompasses an acrylate monomer and/or acrylate oligomers, and a methacrylate monomer and/or methacrylate oligomers.

Examples of the (meth)acrylate compound include monofunctional monomers such as isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 2-(meth)acryloyloxy ethyl hexahydrophthalate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxy ethyl succinate, 2-(meth)acryloyloxy ethyl phthalate, 2-(meth)acryloyloxyethyl-2-hydroxyethyl-phthalate, and t-butylcyclohexyl (meth)acrylate;

bifunctional monomers such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, di(meth)acrylate of a PO adduct of bisphenol A, hydroxy pivalic acid neopentyl glycol di(meth)acrylate, polytetramethylene glycol di(meth)acrylate, polyethylene glycol diacrylate, and tripropylene glycol diacrylate; and trifunctional or higher functional monomers such as trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, and pentaerythritol ethoxy tetra(meth)acrylate.

The (meth)acrylate compound is preferably stearyl (meth)acrylate, lauryl (meth)acrylate, isostearyl (meth)acrylate, ethoxy diethylene glycol (meth)acrylate, isobornyl (meth)acrylate, tetraethylene glycol di(meth)acrylate, glycerin propoxy tri(meth)acrylate, or the like from the viewpoint of photosensitivity, etc.

The (meth)acrylate compound may be a modified product. Examples thereof include ethylene oxide modified (meth)acrylate compounds such as ethylene oxide modified trimethylolpropane tri(meth)acrylate and ethylene oxide modified pentaerythritol tetraacrylate; caprolactone modified (meth)acrylate compounds such as caprolactone modified trimethylolpropane tri(meth)acrylate; and caprolactam modified (meth)acrylate compounds such as caprolactam modified dipentaerythritol hexa(meth)acrylate.

Preferably, the (meth)acrylate compound is in part an ethylene oxide modified (meth)acrylate compound. This is because an ethylene oxide modified (meth)acrylate compound has high photosensitivity, and easily forms a card house structure during gelling of the ink at a low temperature. In addition, since the ethylene oxide modified (meth)acrylate compound is soluble in other ink components at a high temperature and low shrinks at curing, the printed matter is less likely to be curled.

Examples of the ethylene oxide modified (meth)acrylate compound include 4EO modified hexanediol diacrylate CD561 (molecular weight: 358), 3EO modified trimethylolpropane triacrylate SR454 (molecular weight: 429), 6EO modified trimethylolpropane triacrylate SR499 (molecular weight: 560), and 4EO modified pentaerythritol tetraacrylate SR494 (molecular weight: 528) all manufactured by Sartomer Company; polyethylene glycol diacrylate NK ester A-400 (molecular weight: 508), polyethylene glycol diacrylate NK ester A-600 (molecular weight: 742), polyethylene glycol dimethacrylate NK ester 9G (molecular weight: 536), and polyethylene glycol dimethacrylate NK ester 14G (molecular weight: 770) all manufactured by Shin-Nakamura Chemical Co., Ltd.; tetraethylene glycol diacrylate V#335HP (molecular weight: 302) manufactured by OSAKA ORGANIC CHEMICAL INDUSTRY LTD.; 3PO modified trimethylolpropane triacrylate Photomer 4072 (molecular weight: 471) manufactured by Cognis; and 1,10-decanediol dimethacrylate NK ester DOD-N (molecular weight: 310), tricyclodecanedimethanol diacrylate NK ester A-DCP (molecular weight: 304), and tricyclodecanedimethanol dimethacrylate NK ester DCP (molecular weight: 332) all manufactured by Shin-Nakamura Chemical Co., Ltd.

The (meth)acrylate compound may be a polymerizable oligomer. Examples of a polymerizable oligomer include epoxy (meth)acrylate oligomers, aliphatic urethane (meth) acrylate oligomers, aromatic urethane (meth)acrylate oligomers, polyester (meth)acrylate oligomers, and straight-chain (meth)acrylic oligomers.

The cationic polymerizable compound can be an epoxy compound, a vinyl ether compound, and an oxetane compound. In the actinic radiation-curable inkjet white ink, either single or two or more types of the cationic polymerizable compound may be contained.

The epoxy compound is aromatic epoxide, alicyclic epoxide, and aliphatic epoxide. Aromatic epoxide and alicyclic epoxide are preferable in view of enhancing curability.

The aromatic epoxide can be di- or polyglycidyl ether, which is obtained by reacting polyhydric phenol or an alkylene oxide adduct thereof with epichlorohydrin. Examples of the polyhydric phenol or the alkylene oxide adduct thereof to be reacted include bisphenol A and alkylene oxide adducts thereof. The alkylene oxide in the alkylene oxide adduct can be ethylene oxide, and propylene oxide.

The alicyclic epoxide can be a cycloalkane oxide-containing compound, which is obtained by epoxidizing a cycloalkane-containing compound with an oxidizing agent such as hydrogen peroxide or peracid. The cycloalkane in the cycloalkane oxide-containing compound can be cyclohexene or cyclopentene.

The aliphatic epoxide can be di- or polyglycidyl ether, which is obtained by reacting an aliphatic polyhydric alcohol or an alkylene oxide adduct thereof with epichlorohydrin. Examples of the aliphatic polyhydric alcohol include alkylene glycols such as ethylene glycol, propylene glycol, and 1,6-hexanediol. The alkylene oxide in the alkylene oxide adduct can be ethylene oxide and propylene oxide.

Examples of the vinyl ether compound include monovinyl ether compounds such as ethylvinyl ether, n-butylvinyl ether, isobutylvinyl ether, octadecylvinyl ether, cyclohexylvinyl ether, hydroxybutylvinyl ether, 2-ethylhexylvinyl ether, cyclohexane dimethanol monovinyl ether, n-propylvinyl ether, isopropylvinyl ether, isopropenyl ether-o-propylene carbonate, dodecylvinyl ether, diethylene glycol monovinyl ether, and octadecylvinyl ether; and di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, and trimethylolpropane trivinyl ether. Of these vinyl ether compounds, di- or trivinyl ether compounds are preferable in light of curability and adhesion.

The oxetane compound refers to a compound having an oxetane ring. Examples thereof include oxetane compounds described in Japanese Patent Application Laid-Open Nos. 2001-220526, 2001-310937, and 2005-255821. Specific examples thereof include a compound represented by Formula (1) described in the paragraph [0089] of Japanese Patent Application Laid-Open No. 2005-255821, a compound represented by Formula (2) described in the paragraph [0092] thereof, a compound represented by Formula (7) described in the paragraph [0107] thereof, a compound represented by Formula (8) described in the paragraph [0109] thereof, and a compound represented by Formula (9) described in the paragraph [0116] thereof. Formulas (1), (2), (7), (8), and (9) described in Japanese Patent Application Laid-Open No. 2005-255821 are shown below.

[Formula 3]

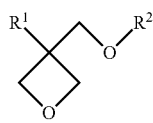

General formula (1)

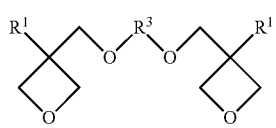

General formula (2)

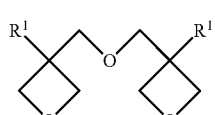

General formula (7)

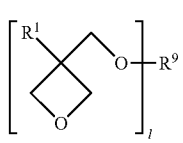

General formula (8)

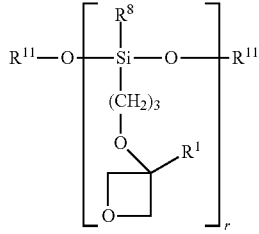

General formula (9)

The content of the photocurable compound in the actinic radiation-curable inkjet white ink is preferably from 1 to 97 mass %, and more preferably from 30 to 95 mass %.

[Photopolymerization Initiator]

The actinic radiation-curable inkjet white ink according to one aspect of the present invention contains a photopolymerization initiator. A radical polymerization initiator can be used in the case where the photocurable compound is a radical polymerizable compound, and a photoacid generating agent can be used in the case where the photocurable compound is a cationic polymerizable compound.

The radical polymerization initiator includes an intramolecular bond cleaving type and an intramolecular hydrogen withdrawing type. Examples of the intramolecular bond cleaving type photopolymerization initiator include acetophenones such as diethoxy acetophenone, 2-hydroxy-2-methyl-1-phenyl propan-1-one, benzyl dimethyl ketal, 1-(4-isopropyl phenyl)-2-hydroxy-2-methyl propan-1-one, 4-(2-hydroxy ethoxy) phenyl-(2-hydroxy-2-propyl) ketone, 1-hydroxy cyclohexyl phenyl ketone, 2-methyl-2-morpholino-(4-thio methylphenyl) propan-1-one, and 2-benzyl-2-dimethylamino-1-(4-morpholino phenyl)-butanone; benzoins such as benzoin, benzoin methyl ether and benzoin isopropyl ether; acyl phosphine oxides such as 2,4,6-trimethyl benzoin diphenyl phosphine oxide; benzil, and methylphenyl glyoxy ester.

Examples of the intramolecular hydrogen withdrawing type photopolymerization initiator include benzophenones such as benzophenone, o-benzoyl benzoic acid methyl-4- phenyl benzophenone, 4,4'-dichloro benzophenone, hydroxy benzophenone, 4-benzoyl-4'-methyldiphenyl sulfide, acrylated benzophenone, 3,3',4,4'-tetra-(t-butyl peroxy carbonyl) benzophenone; and 3,3'-dimethyl-4-methoxy benzophenone; thioxanthones such as 2-isopropyl thioxanthone, 2,4-dimethyl thioxanthone, 2,4-diethyl thioxanthone, and 2,4-dichloro thioxanthone; aminobenzophenones such as Michler's ketone and 4,4'-diethylaminobenzophenone; 10-butyl-2-chloro acridone, 2-ethyl anthraquinone, 9,10-phenanthrene quinone, and camphor quinone.

The content of the photopolymerization initiator in the actinic radiation-curable inkjet white ink, which may vary depending on actinic radiation and the type of the photocurable compound, is preferably from 0.01 mass % to 10 mass %.

The actinic radiation-curable inkjet white ink may contain a photoacid generating agent as the photopolymerization initiator. Examples of the photoacid generating agent include compounds used for chemical amplification type photoresists or photo-cationic polymerization (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

If necessary, the actinic radiation-curable inkjet white ink may further contain a photopolymerization initiator auxiliary agent, a polymerization inhibitor, or the like. The photopolymerization initiator auxiliary agent may be a tertiary amine compound and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxy ethylaniline, triethylamine, and N,N-dimethyl hexylamine Among them, N,N-dimethylamino-p-benzoic acid ethyl ester and N,N-dimethylamino-p-benzoic acid isoamyl ethyl ester are preferable. These compounds may be contained in the actinic radiation-curable inkjet white ink either singly or in combination.

Examples of the polymerization inhibitor include (alkyl) phenol, hydroquinone, catechol, resorcin, p-methoxyphenol, t-butyl catechol, t-butyl hydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferrone, aluminum N-nitrosophenyl hydroxylamine, tri-p-nitrophenylmethyl, N-(3-oxyanilino-1, 3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

[Additional Components]

If necessary, the actinic radiation-curable inkjet white ink may further contain additional component(s). Additional components can be various additives and other resins. Examples of the additives include surfactants, leveling agents, matting agents, IR absorbers, antibacterial agents, and basic compounds that serve to increase the storage stability of ink. Examples of the basic compounds include basic alkali metal compounds, basic alkali earth metal compounds, and basic organic compounds such as amines Examples of other resins include resins for adjusting the physical properties of a cured film; examples thereof include polyester resins, polyurethane resins, vinyl resins, acrylic resins, and rubber resins.

[Preparation of Actinic Radiation-Curable Inkjet White Ink]

The actinic radiation-curable inkjet white ink can be obtained by mixing the above-mentioned pigment, dispersant, wax, photocurable compound, and photopolymerization initiator with arbitrary components under heating. The obtained mixed solution is preferably filtered through a predetermined filter. Here, a dispersion containing the pigment and the dispersant may be prepared in advance, and the other components may be added thereto and mixed under heating.

[Physical Properties of Actinic Radiation-Curable Inkjet White Ink]

Because the actinic radiation-curable inkjet white ink according to one aspect of the present invention contains a wax, it can undergo a temperature-induced reversible sol-gel phase transition. Since a sol-gel phase transition type actinic radiation-curable ink is a sol at high temperatures (e.g., about 80° C.), the ink can be discharged from a recording head for ink discharge, and the ink landed on a recording medium undergoes gelation by natural cooling. Accordingly, combining of neighboring dots is prevented and thus image quality improves.

In order to enhance ability of ejection of the actinic radiation-curable inkjet white ink according to one aspect of the present invention, the viscosity of the ink at a high temperature is preferably equal to or lower than a predetermined value. Specifically, the viscosity at 80° C. of the ink is preferably from 3 to 20 mPa·s, more preferably from 6.0 to 15.0 mPa·s, and even more preferably from 7.0 to 12.0 mPa·s. In order to prevent combining of neighboring dots, the ink viscosity at room temperature after landing preferably has a certain value or more. Specifically, the viscosity at 25° C. of the actinic radiation-curable inkjet white ink is preferably 1,000 mPa·s or more.

The gelation temperature of the actinic radiation-curable inkjet white ink according to one aspect of the present invention is preferably 40° C. or higher and 70° C. or lower, and more preferably 50° C. or higher and 65° C. or lower. In the case where the ejection temperature is near 80° C., if the gelation temperature of the ink exceeds 70° C., gelation easily occurs at the time of ejection thus reducing ability of ejection. On the other hand, if the gelation temperature is lower than 40° C., the ink after landed on a recording medium does not undergo gelation quickly. The gelation temperature is a temperature when fluidity is lowered by gelation of the ink in a sol state in a process of cooling the sol-state ink.

The viscosity at 80° C., the viscosity at 25° C., and the gelation temperature of the actinic radiation-curable inkjet white ink according to one aspect of the present invention can be found by measuring a change in dynamic viscoelasticity caused by a temperature variation of the ink using a rheometer. Specifically, when the ink is heated to 100° C. and cooled to 25° C. with conditions including shear rate of 11.7 (1/s) and temperature decrease rate of 0.1° C./s, a viscosity change curve according to temperature is obtained. Further, the viscosity at 80° C. and the viscosity at 25° C. can be obtained by reading each of the viscosities at 80° C. and 25° C. in a temperature change curve of the viscosity. The gelation temperature can be obtained from a temperature at which the viscosity reaches 200 mPa·s in a viscosity change curve according to temperature.

As for the rheometer, stress control type rheometer Physica MCR series manufactured by Anton Paar can be used. The size of the corn plate can be 75 mm and the corn angle can be 1.0°.

[Ink Set Containing Actinic Radiation-Curable Inkjet White Ink]

An ink set may be prepared by using the actinic radiation-curable inkjet white ink according to one aspect of the present invention and a color ink in combination. The color ink for an ink set is not particularly limited, and may be appropriately selected in accordance with an intended image. The color ink is preferably an ink dischargeable through inkjet as is the case with the actinic radiation-curable inkjet white ink according to one aspect of the present invention from the viewpoint of easiness in formation of an image, and is preferably an actinic radiation-curable ink. The color ink is preferably an ink containing a wax or a gelling agent and as a result being capable of sol-gel phase transition, from the viewpoint of easiness in formation of an image.

In one aspect of an image forming method to be described later, the above ink set enables formation of a top coating part and a primer coating part of an image by applying the actinic radiation-curable inkjet white ink according to one aspect of the present invention, before or after application of a color ink.

The color ink may be a black ink, a cyan ink, a magenta ink, or a yellow ink, or an ink having another color. In the present invention, the color ink refers to an ink other than the actinic radiation-curable inkjet white ink according to one aspect of the present invention. In the present invention, a single or a plurality of ink(s) selected from the color inks may be combined with the actinic radiation-curable inkjet white ink according to one aspect of the present invention into an ink set for formation of an image.

2. Image Forming Method and Inkjet Recording Apparatus

[Image Forming Method]

The image forming method according to one aspect of the present invention includes: (a) attaching the above actinic radiation-curable inkjet white ink onto a recording medium through discharge from a recording head for ink discharge, and (b) irradiating the attached actinic radiation-curable inkjet white ink with actinic radiation.

When a white ink or a color ink to be described later is attached onto a recording medium in the present invention, the ink may be attached directly onto a recording medium, or the ink may be further attached onto an ink already attached or cured onto a recording medium. For example, a white ink may be attached and cured onto a color ink attached or cured onto a recording medium, or after a white ink is attached and cured directly onto a recording medium, a color ink may be further attached and cured onto the attached or cured white ink. Thus can be formed an image having a top coating part or a primer coating part made of the actinic radiation-curable inkjet white ink according to one aspect of the present invention. Alternatively, an image consisting only of white color can be formed by attaching and curing the actinic radiation-curable inkjet white ink according to one aspect of the present invention onto a recording medium, without using a color ink.

To enhance ability of the white ink discharge in the step of (a) attaching the actinic radiation-curable inkjet white ink onto a recording medium through discharge from a recording head for ink discharge, the temperature of the inkjet ink inside the recording head for ink discharge is preferably set such that it is from 10 to 30° C. higher than the gel transition temperature of the white ink. Controlling the ink temperature inside the recording head for ink discharge to (gelation temperature) +10° C. or higher can prevent the gelation of the ink inside the recording head for ink discharge or at the surface of the nozzle, and thus the ink droplet can be discharged stably. On the other hand, controlling the ink temperature inside the recording head for ink discharge to (gelation temperature) +30° C. or lower can prevent the deterioration of the ink components due to a high temperature of the ink. The white ink can be heated in the recording head for ink discharge of the inkjet recording apparatus, in the ink channel connected to the recording head for ink discharge, or in the ink tank connected to the ink channel.

The amount of liquid per white ink droplet discharged from each nozzle of the recording head for ink discharge may vary depending on, for example, the viscosity of the white ink, and it is preferably from 0.5 to 10 pl, and, for discharging only to a desired region, it is more preferably from 0.5 to 4.0 pl, and even more preferably from 1.5 to 4.0 pl. Even if the white ink according to one aspect of the present invention is applied in such an amount, the ink can be discharged only to a desired region without excessive wet spread because the ink undergoes sol-gel phase transition.

The droplets of the white ink attached onto a recording medium are cooled and quickly undergo gelation by sol-gel phase transition. As a result, the droplets of the white ink can be pinned without excessive wet spread. Thus, curing of the photocurable compound is less likely to be inhibited by oxygen.

By allowing white ink droplets to be discharged from the recording head for ink discharge, the white ink droplets are attached onto a recording medium. The temperature of the recording medium when the droplets of the white ink are attached onto the recording medium is preferably set such that it is from 10 to 20° C. lower than the gelation temperature of this ink. When the temperature of the recording medium is excessively low, the white ink droplets undergo gelation and pinning too fast. On the other hand, when the temperature of the recording medium is excessively high, it is difficult for the ink droplets to undergo gelation, and therefore neighboring dots of the ink droplets may be mixed with each other. By appropriately adjusting the temperature of the recording medium, it is possible to achieve both a moderate level of leveling that does not allow for mixing among neighboring dots of the ink droplets and appropriate pinning The recording medium can be either paper or a resin film. Examples of the paper include coated paper for printing and coated paper B for printing. Further, examples of the resin film include a polyethylene terephthalate film, polypropylene film and a vinyl chloride film.

The conveyance speed of the recording medium is preferably from 30 to 120 mm/s. As the conveyance speed increases, the image forming speed also increases, and thus desirable. However, when the conveyance speed is excessively high, the image quality is deteriorated or photocuring of white ink (described later) become insufficient.

By irradiating the droplets of the white ink attached onto a recording medium with actinic radiation in the step of (b) irradiating the attached actinic radiation-curable inkjet white ink with actinic radiation, the photocurable compounds contained in the ink undergo crosslinking or polymerization to cure the ink droplets.

The actinic radiation to be directed on the white ink droplets attached onto a recording medium can be ultraviolet rays from metal halide lamps, LED light source(s), or the like. Use of an LED, among these light sources, can prevent the white ink droplets from melting and being poorly cured at the surface of the cured film of the ink droplets by radiation heat. Examples of the LED include 395 nm, Water Cooled LED manufactured by Phoseon Technology.

A light source is installed such that it provides UV ray of from 360 to 410 nm wavelength with peak illuminance from 0.5 to 10 W/cm$^2$ and preferably from 1 to 5 W/cm$^2$ on a surface of the image. The light quantity to be irradiated onto an image is preferably adjusted to be lower than 500 mJ/cm$^2$ in order to limit the irradiation of the ink droplets with radiation heat.

[Image Forming Method Using Ink Set]

In the case where an image is formed by using the above ink set, the image forming method according to one aspect of the present invention may include, in addition to the above-described (a) attaching the above actinic radiation-curable inkjet white ink onto the recording medium through discharge from a recording head for ink discharge, and (b) irradiating the attached actinic radiation-curable inkjet white ink with actinic radiation, (c) attaching one or more color ink(s) onto a recording medium, and (d) fixing the attached color ink(s). In the present invention, fixing color ink(s) refers to curing color ink(s) attached onto a recording medium. The actinic radiation-curable inkjet white ink according to one aspect of the present invention undergoes gelation when being attached, and thus is less likely to mix with a color ink.

In the case where the actinic radiation-curable inkjet white ink according to one aspect of the present invention is used for primer coating, (c) attaching color ink(s) onto a recording medium is performed after (a) attaching the actinic radiation-curable inkjet white ink onto a recording medium. This enables formation of an image in which color ink(s) is/are applied on a white background, and thus an image having clear contrast can be formed.

In this case, (b) irradiating the attached white ink with actinic radiation may be performed before or after (c) attaching color ink(s) onto a recording medium. If the step (b) is performed before the step (c), the color ink is attached onto the cured white ink, and thus contamination of the white ink with the color ink can be reduced. If the step (b) is performed after the step (c), (d) curing the color ink and (b) curing the white ink can be performed sequentially or simultaneously, and thus a time required for image formation can be shortened. In the case where the color ink is an actinic radiation-curable ink containing a photocurable compound and a photopolymerization initiator, for example, (d) curing the color ink and (b) curing the white ink can be performed by one irradiation with actinic radiation.

The color ink is preferably an ink containing a wax or a gelling agent, and is preferably an ink which is a sol due to heating before being attached onto a recording medium and undergoes gelation by sol-gel phase transition when being attached onto a recording medium and cooled. When such a color ink is used, both the color ink and the white ink undergo gelation by sol-gel phase transition when being attached onto a recording medium. Accordingly, the film of the white ink before curing is less likely to contaminate the film of the color ink before curing even if attaching the color ink in the step (c) is performed before curing the white ink in the step (b).

In the case where the actinic radiation-curable inkjet white ink according to one aspect of the present invention is used for top coating, (a) attaching the actinic radiation-curable inkjet white ink onto a recording medium is performed after (c) attaching color ink(s) onto a recording medium. This enables coating the color ink with the actinic radiation-curable inkjet white ink, and thus the durability of a formed image is enhanced. If a white ink is attached and cured onto a color ink attached or cured onto a recording medium having optical transparency, the refractive index of the background part when being viewed from the surface opposite to the surface having a formed image can be increased. In this case, the white ink according to one aspect of the present invention provides a background color, which can enhance the esthetic performance of a formed image.

Also in this case, (d) fixing the attached color ink(s) may be performed before or after (a) attaching the white ink onto a recording medium. If the step (d) is performed before the step (a), the white ink is attached onto the cured color ink, and contamination of the color ink with the white ink can be reduced. If the step (d) is performed after the step (a), (d) curing the color ink and (b) curing the white ink can be performed sequentially or simultaneously, and thus a time required for image formation can be shortened. In the case where the color ink is an actinic radiation-curable ink containing a photocurable compound and a photopolymerization initiator, for example, (d) curing the color ink and (b) curing the white ink can be performed by one irradiation with actinic radiation.

The color ink is preferably an ink containing a wax or a gelling agent, and is preferably an ink which is a sol due to heating before being attached onto a recording medium and undergoes gelation by sol-gel phase transition when being attached onto a recording medium and cooled. When such a color ink is used, both the color ink and the white ink undergo gelation by sol-gel phase transition when being attached onto a recording medium. Accordingly, the film of the color ink before curing is less likely to contaminate the film of the white ink before curing even if attaching the white ink in the step (a) is performed before curing the color ink in the step (d).

The attaching method in (c) attaching one or more color ink(s) onto a recording medium is not limited, and a suitable method may be selected in accordance with the type of a color ink to be used. Examples of the attaching method which can be used include an application method using a wire bar, a roll coater, or the like, a spraying method using a spray or the like, an offset printing method, and an inkjet printing method. In the case where an inkjet printing method is employed among them and an inkjet recording apparatus is configured to discharge a color ink from the recording head for ink discharge, an apparatus configuration similar to that for attaching a white ink can be used, which enables simplification of an apparatus and provides economic advantages in both space and cost. In the case where a plurality of color inks is used, each color ink is discharged to attach onto a recording medium.

In the case where the color ink contains a wax or a gelling agent, the temperature of the inkjet ink inside the recording head for ink discharge can be suitably adjusted within ±10° C. of the temperature of the white ink to enhance ability of the color ink droplet discharge.

The amount of liquid per color ink droplet discharged from each nozzle of the recording head for ink discharge may vary depending on the resolution of an image. It is preferably from 0.5 to 10 pl, and, for forming a high-resolution image, it is more preferably from 0.5 to 4.0 pl. Particularly in the case where the color ink contains a wax or a gelling agent, it is possible to stably form a high-resolution image even with such a liquid amount.

The fixing method in (d) fixing the attached color ink(s) is not limited, and a suitable method may be selected in accordance with the type of a color ink to be used. Examples of the fixing method which can be used include a method of heating the ink, a method of evaporating moisture contained in the ink, and a pressurizing method using a roller fixing apparatus or a belt fixing apparatus. In the case where the color ink is an actinic radiation-curable ink containing a photocurable compound and a photopolymerization initiator, the ink can be cured and fixed by irradiation with actinic radiation.

The total film thickness of the ink droplet after curing is preferably from 1 to 20 μm. The term "total film thickness of the ink droplet" refers to a maximum value of the film thickness of the cured film of the color ink and the white ink drawn on a recording medium.

[Inkjet Recording Apparatus]

In the case where attachment and fixation of the actinic radiation-curable inkjet white ink according to one aspect of the present invention and attachment and fixation of an actinic radiation-curable color ink are performed by using the above ink set in a single inkjet recording apparatus, an apparatus having any of configurations as illustrated in FIGS. 1A to 3 can be used. The inkjet recording apparatus of actinic radiation-curable inkjet type includes line recording type (single pass recording type) and serial recording type. Although any type may be selected depending on desired resolution or recording speed, the line recording (single pass recording type) is preferred from the viewpoint of high speed recording.

Figure 1B:
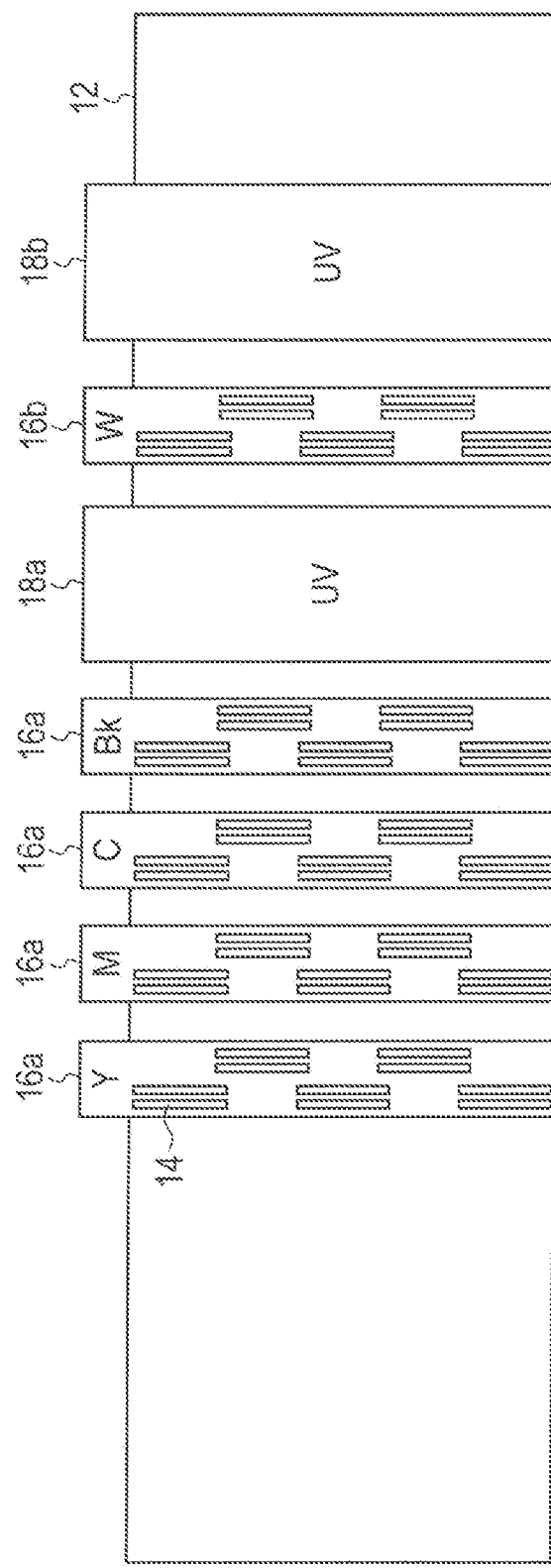
FIG. 1B is a top view illustrating one example of the configuration of the main part of an inkjet recording apparatus of line recording type which can be used for formation of an image according to one aspect of the present invention.
Figure 2A:
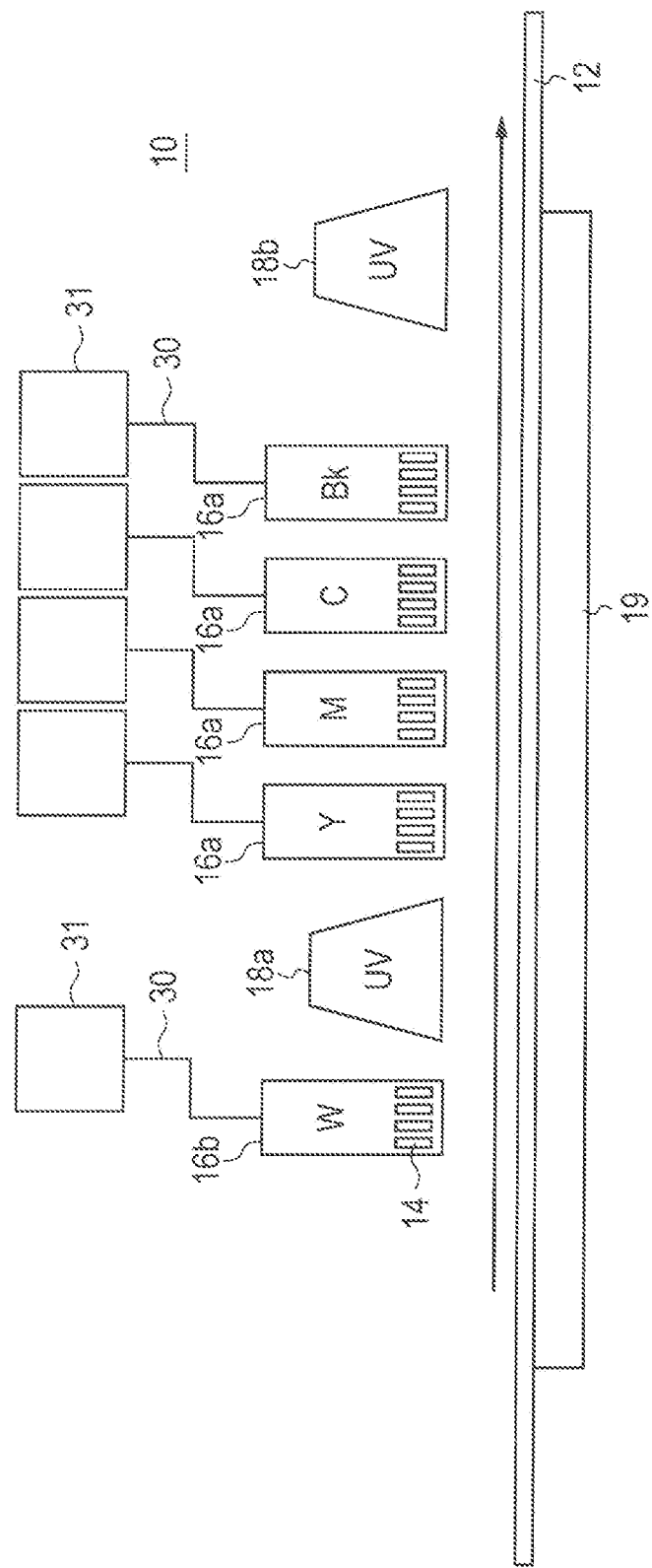
FIG. 2A is a side view illustrating another example of the configuration of the main part of an inkjet recording apparatus of line recording type which can be used for formation of an image according to another aspect of the present invention.

FIG. 1A is a side view illustrating an example of the configurations of the main part of an inkjet recording apparatus of line recording type, and FIG. 1B is a top view thereof. FIG. 2A is a side view illustrating another example of the configurations of the main part of an inkjet recording apparatus of line recording type, and FIG. 2B is a top view thereof.

As illustrated in FIGS. 1A, 1B, 2A, and 2B, inkjet recording apparatus 10 has head carriage 16 (16a and 16b) for accommodating a plurality of recording heads for ink discharge 14, ink channel 30 connected to head carriage 16, ink tank 31 for storing the ink to be fed via ink channel 30, and light irradiation section 18 (18a and 18b) which covers the entire width of recording medium 12 and which is arranged at a downstream side of head carriage 16 (conveyance direction of the recording medium), and temperature control section 19 installed on a backside of recording medium 12.

In inkjet recording apparatus 10 illustrated in FIGS. 1A and 1B, head carriage 16a for the color ink, light irradiation section 18a for color ink droplet curing, head carriage 16b for the white ink, and light irradiation section 18b for white ink droplet curing are arranged in the order presented. In this apparatus, the color ink and the white ink can be cured individually. In the case where the color ink and the white ink are cured simultaneously by one irradiation with actinic radiation, only light irradiation section 18b may be provided without providing light irradiation section 18a.

Figure 2B:
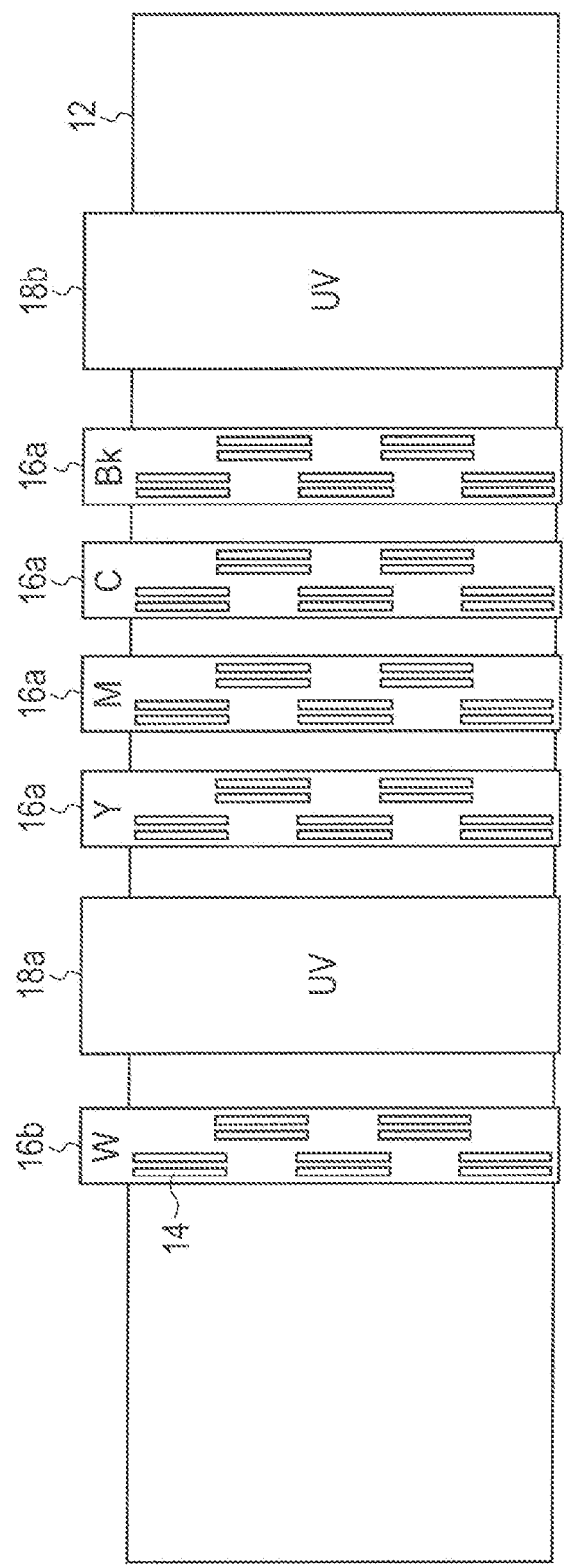
FIG. 2B is a top view illustrating another example of the configuration of the main part of an inkjet recording apparatus of line recording type which can be used for formation of an image according to another aspect of the present invention.

On the other hand, in inkjet recording apparatus 10 illustrated in FIGS. 2A and 2B, head carriage 16b for the white ink, head carriage 16a for the color ink, and light irradiation section 18 are arranged in the order presented. In this apparatus, the white ink and the color ink can be cured individually. In the case where the white ink and the color ink are cured simultaneously by one irradiation with actinic radiation, only light irradiation section 18b may be provided without providing light irradiation section 18a.

Head carriage 16 in inkjet recording apparatus 10 includes head carriage 16a for the color ink and head carriage 16b for the white ink. Head carriage 16a for the color ink includes head carriages for different colors. As illustrated in, for example, FIG. 1B, head carriages 16a and 16b are fixedly arranged so as to cover the entire width of recording medium 12 and accommodates a plurality of recording heads for ink discharge 14. Recording head for ink discharge 14 is designed to receive color ink or white ink from ink tank 31.

A plurality of recording heads for ink discharge 14 is installed for each color in the conveyance direction of recording medium 12. The number of recording heads for ink discharge 14 that are arranged in the conveyance direction of recording medium 12 is determined based on the nozzle density of recording head for ink discharge 14 and the resolution of a printed image. For example, when an image having the resolution of 1,440×1,440 dpi is formed by using recording head for ink discharge 14 with a drop volume of 2 pl and a nozzle density of 360 dpi, four of recording head for ink discharge 14 can be arranged in a staggered manner relative to the conveyance direction of recording medium 12. Further, when an image having the resolution of 720× 720 dpi is formed by using recording head for ink discharge 14 with a drop volume of 6 pl and a nozzle density of 360 dpi, two of recording head for ink discharge 14 can be arranged in a staggered manner. As described herein, dpi represents the number of ink droplets (dots) per 2.54 cm.

Ink tank 31 is connected to head carriage 16 via ink channel 30. Ink channel 30 is a passage for supplying an ink in ink tank 31 to head carriage 16. For stable discharge of ink droplets, the ink present in ink tank 31, ink channel 30, head carriage 16, and recording head for ink discharge 14 is heated to a predetermined temperature to maintain the gel state.

Light irradiation sections 18a and 18b cover the entire width of recording medium 12 and they are arranged at a downstream side of head carriage 16 relative to the conveyance direction of the recording medium. Light irradiation sections 18a and 18b irradiate, with light, the ink droplets which have been discharged from recording head for ink discharge 14 and attached onto recording medium 12 so as to cure the ink droplets.

Temperature control section 19 is installed on a backside of recording medium 12 and it maintains recording medium 12 at a predetermined temperature. As illustrated for example in FIG. 1A, temperature control section 19 may be divided to portions on head carriage 16a side for the color ink and on head carriage 16b side for the white ink. Temperature control section 19 can be various heaters, for example.

Hereinafter, the image forming method using inkjet recording apparatus 10 of a line recording type is described. In the recording apparatuses of FIGS. 1A and 1B, recording medium 12 is conveyed to a region between head carriage 16a for the color ink of inkjet recording apparatus 10 and temperature control section 19. Meanwhile, recording medium 12 is adjusted to a predetermined temperature by temperature control section 19. Subsequently, the ink droplets at a high temperature are discharged from recording head for ink discharge 14 of head carriage 16a for color ink and attached to (landed on) recording medium 12. If necessary, the ink droplets of the color ink attached to recording medium 12 are then cured by light irradiation using light irradiation section 18a.

Further, the ink droplets at a high temperature are discharged from recording head for ink discharge 14 of head carriage 16b for the white ink and attached onto recording medium 12. The white ink droplets attached onto recording medium 12 are cured by light irradiation using light irradiation section 18b.

In the recording apparatuses of FIGS. 2A and 2B, recording medium 12 is conveyed to a region between head carriage 16b for the white ink of inkjet recording apparatus 10 and temperature control section 19. On the other hand, recording medium 12 is adjusted to a predetermined temperature by temperature control section 19. Subsequently, the ink droplets at a high temperature are discharged from recording head for ink discharge 14 of head carriage 16b for the white ink and attached onto recording medium 12. Then, the white ink droplets attached onto recording medium 12 are cured by light irradiation using light irradiation section 18a, if necessary.

Further, the ink droplets at a high temperature are discharged from recording head for ink discharge 14 of head carriage 16a for the color ink and attached onto recording medium 12. Then, the color ink droplets attached onto recording medium 12 are cured by light irradiation using light irradiation section 18b.

Figure 3:
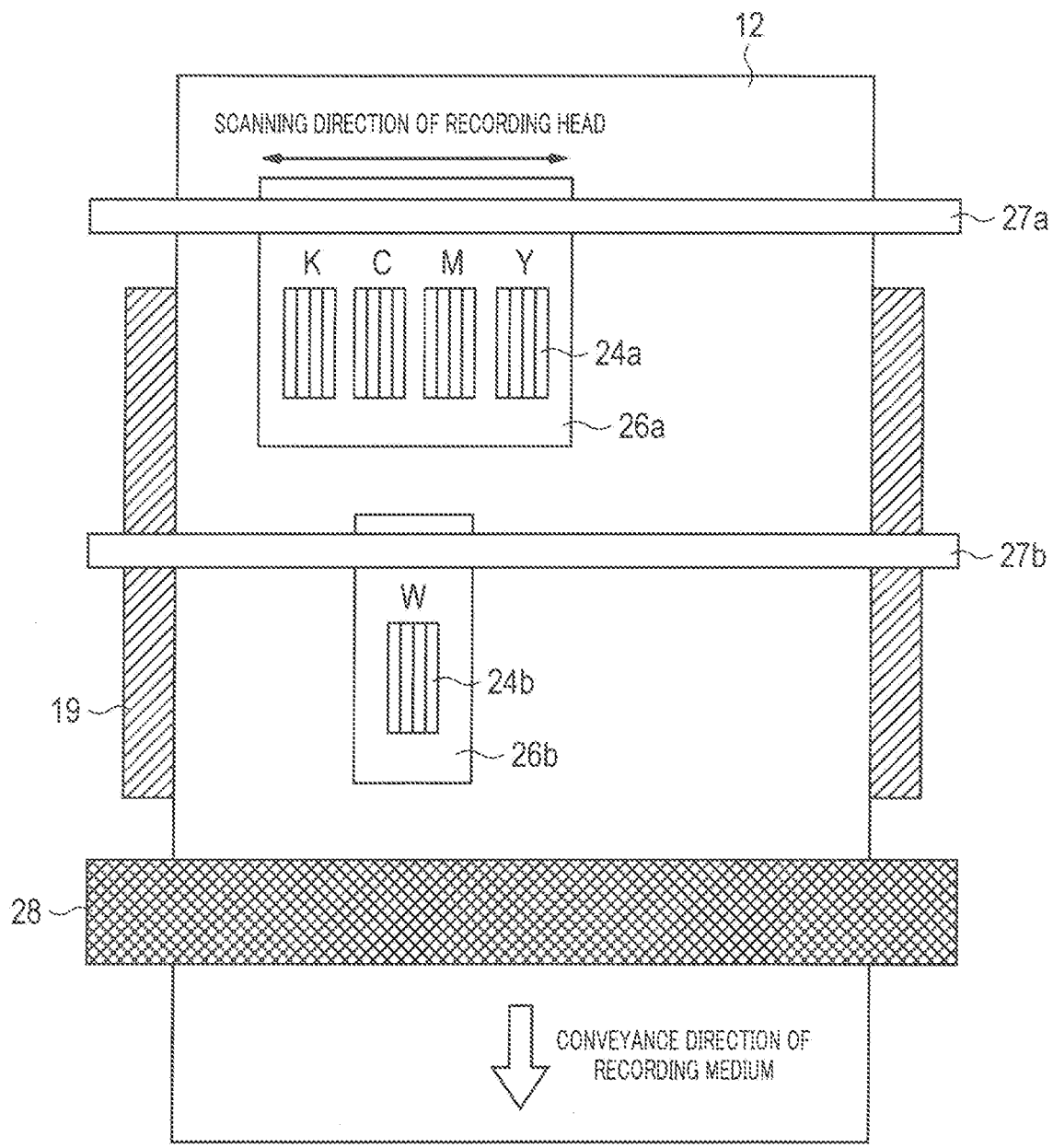
FIG. 3 is a top view illustrating one example of the configuration of the main part of an inkjet recording apparatus of serial recording type which can be used for formation of an image according to yet another aspect of the present invention.

FIG. 3 is a diagram illustrating an example of the configuration of the main part of inkjet recording apparatus 20 of a serial recording type. As illustrated in FIG. 3, inkjet recording apparatus 20 can be configured in the same manner as that depicted in FIGS. 1A and 1B except that it has head carriages 26a and 26b each of which has a width narrower than the entire width of the recording medium and accommodates a plurality of recording heads for ink discharge 24a and 24b instead of head carriages 16a and 16b each of which is fixedly arranged so as to cover the entire width of recording medium, and guide sections 27a and 27b for operating head carriage 26 in the width direction of recording medium 12.

In inkjet recording apparatus 20 of serial recording type, head carriage 26 discharges the ink droplets from recording head for ink discharge 24 accommodated in head carriage 26 while moving along guide section 27 in the width direction of recording medium 12. Once head carriage 26 moves completely in the width direction of recording medium 12 (for each pass), recording medium 12 is delivered in the conveyance direction. Except those operations, the image is recorded in almost the same manner as inkjet recording apparatus 10 of a line recording type that is described above.

In inkjet recording apparatus 20 having the configuration illustrated in FIG. 3, the droplets of the color ink and the white ink are exposed to light at once by light irradiation section 28. If necessary, a light irradiation section for color ink droplet curing may be disposed between head carriage 26a for the color ink and head carriage 26b for the white ink. Although head carriage 26a for attaching the color ink is disposed in the upstream, head carriage 26b for attaching the white ink may be disposed in the upstream of head carriage 26a.

EXAMPLES

Hereinafter, the present invention will be described in more detailed with reference to Examples, but it is not understood that the scope of the present invention is limited to Examples.

Example 1

[Preparation of Comb-Shaped Block Copolymer Having Tertiary Amine Group]

An active catalyst (zeolite) loaded inside a flask reactor and 500 g of lauryl alcohol (KALCOL 2098 manufactured by Kao Corporation) were charged in a buffering chamber, and the liquid was circulated between the buffering chamber and the reactor while feeding a hydrogen gas thereinto. Thereafter, the inner temperature of the reactor was raised to 65° C., and a DPGMA solution (Arrownix M-120 manufactured by Toagosei Co., Ltd.) of PB-824 (manufactured by Ajinomoto Fine-Techno Co., Inc.) was then fed into the reactor, and the inner temperature of the reactor was further raised to 90° C. to initiate a reaction. Three hours after the initiation of the reaction, feeding of the PB-824 solution was stopped and the whole system was cooled. The whole amount of the solution inside the buffering chamber and the reactor was extracted to prepare dispersant D (50 wt % solid content in DPGMA solution).

Dispersant J was prepared in accordance with the same procedure as the above except that the dispersant was replaced with BYK-2091 (manufactured by BYK-Chemie GmbH).

[Preparation of White Pigment Dispersion]

White pigment dispersion 1 was prepared by using the following components.

White pigment 1: CR-EL (ISHIHARA SANGYO KAISHA, LTD.) 25.0 wt %

Dispersant A: BYK JET-9151 (BYK-Chemie GmbH) 10.0 wt %

Photocurable compound: dipropylene glycol monoacrylate 64.5 wt %

Polymerization inhibitor: Irgastab UV-10 (manufactured by BASF SE) 0.5 wt %

The components were put in a 200 cc plastic bottle container at the above blending ratio, and 120 g of zirconia beads having a median diameter of 0.5 mmϕ were put therein. After the container was sealed with a lid, dispersing was performed with a vibration mill (Red Devil 4500L manufactured by NISHIMURA MFG. CO., LTD.) for 4 hours. After the dispersing, the beads were separated and the dispersion was extracted.

In accordance with the same procedure as the above except that the dispersant was replaced with one of dispersants A to J listed in Table 1 and white pigment 1 was replaced with one of white pigments 2 to 6 listed in Table 2, a white pigment dispersion was prepared for all combination patterns of a dispersant and a white pigment to obtain white pigment dispersions A-1 to J-6.

TABLE 1

| Dispersant No. | Manufacturer name | Product name | Adsorbing group | Structure |
| --- | --- | --- | --- | --- |
| A | BYK-Chemie GmbH | BYK JET-9151 | tertiary amine | comb shape |
| B | BYK-Chemie GmbH | BYK-168 | tertiary amine | comb shape |
| C | BYK-Chemie GmbH | BYK N-22024 | tertiary amine | comb shape |
| D | Ajinomoto Fine-Techno Co., Inc. | PB-824 | primary amine → conversion into tertiary amine | comb shape |

TABLE 1-continued

| Dispersant No. | Manufacturer name | Product name | Adsorbing group | Structure |
|---|---|---|---|---|
| F | Ajinomoto Fine-Techno Co., Inc. | PB-824 | primary amine | comb shape |
| G | Avecia | Solsperse24000 | primary amine | comb shape |
| H | BYK-Chemie GmbH | BYK-2091 | secondary amine | straight chain |
| I | BASF | efka7701 | secondary amine | comb shape |
| J | BYK-Chemie GmbH | BYK-2091 | secondary amine → conversion into tertiary amine | straight chain |

TABLE 2

| White pigment No. | Manufacturer name | Product name | Amount of alumina coating (wt %) | Amount of residual $Na^+$ (ppm) |
|---|---|---|---|---|
| 1 | ISHIHARA SANGYO KAISHA, LTD. | CR-EL | 0.13 | 40 |
| 2 | Sakai Chemical Industry Co., Ltd. | TCR-52 | 0.34 | 63 |
| 3 | Sakai Chemical Industry Co., Ltd. | R-310 | 0.51 | 141 |
| 4 | Sakai Chemical Industry Co., Ltd. | R-32 | 0.83 | 180 |
| 5 | Sakai Chemical Industry Co., Ltd. | GTR-100 | 1.22 | 221 |
| 6 | ISHIHARA SANGYO KAISHA, LTD. | CR-90 | 5.24 | 540 |

[Preparation of Actinic Radiation-Curable Ink]

Thereafter, a photocurable compound, a wax, and a photopolymerization initiator were added to each of the dispersions while heating to 60° C. at the following ratio to prepare actinic radiation-curable inks A-1 to J-6.

White pigment dispersions A-1 to J-6: 50.0 wt %

Photocurable compound: polyethylene glycol diacrylate (PEGDA) (manufactured by Daicel Chemical Industries, Ltd.) 25.0 wt %

Photocurable compound: 4EO modified pentaerythritol tetraacrylate (manufactured by Toagosei Co., Ltd.) 18.0 wt %

Wax: KAO Wax T-1 (aliphatic ketone) (manufactured by Kao Corporation) 2.5 wt %

Wax: UNISTAR M222 (fatty acid ester) (manufactured by Union Carbide Corporation) 2.5 wt %

Photopolymerization initiator: ITX (manufactured by BASF) 0.3 wt %

Photopolymerization initiator: Irgacure 819 (manufactured by BASF SE) 0.3 wt %

[Inkjet Printing]

Each of the actinic radiation-curable inks was filtered through a WAC filter (precision: 0.3 µm) manufactured by Pall Corporation. Thereafter, each ink was introduced into a Konica Minolta inkjet head (KM1048), and a solid image was printed under conditions including a printing width of 100 mm×100 mm and a resolution of 720×720 dpi. An OK topcoat (printing sheet) was used for the printing base material. By using an LED lamp manufactured by KYOCERA Corporation as a light source for UV irradiation, the printed ink was cured by irradiation with an ultraviolet ray at an energy of 250 mJ.

[Evaluation Method]

(1) Viscosity Change

Each of the actinic radiation-curable inks was put in a heat-resistant tube, and stored in a high-temperature chamber at 85° C. for 1 month.

By using the stress rheometer model MCR-102 manufactured by Anton Paar, the torque in constant rotation on a corn plate of 75 mmϕ at a shear rate of 1,000 (1/sec) and a temperature of 80° C. for 5 minutes was measured for each of the ink before storage and the ink after storage, and converted to a viscosity value to obtain the viscosity of the ink before storage and the viscosity of the ink after storage. If the viscosity difference between before and after storage was within 10.0 mPas, the viscosity change was determined to be small (denoted as + in Tables 3 to 6), and if the viscosity difference was within 1.0 mPas, the viscosity change was determined to be further small (denoted as ++ in Tables 3 to 6).

(2) Glossiness Difference

By using a digital handy glossmeter (Gloss Checker IG-331 manufactured by HORIBA, Ltd.), the reflection glossiness value at 60° C. was measured for a solid image made of each of the actinic radiation-curable inks. Reduction of the reflection glossiness value from the average glossiness value of solid images of Yellow, Cyan, and Black (40) was calculated for a solid white image made of each of the actinic radiation-curable inks. If the absolute value of the reflection glossiness value difference was less than 10, the glossiness difference was determined to be small (denoted as + in Tables 3 to 6), and if the absolute value of the reflection glossiness value difference was less than 4, the glossiness difference was determined to be further small (denoted as ++ in Tables 3 to 6).

(3) Head Clogging

Printing was continuously performed for 100 sheets under the above-described conditions, and the number of failed head nozzles was counted. If the number of failed head nozzles was less than 10, the occurrence of head clogging was determined to be infrequent (denoted as + in Tables 3 and 4), and if the number of failed head nozzles was less than 5, the occurrence of head clogging was determined to be further infrequent (denoted as ++ in Tables 3 and 4).

The results are shown in Tables 3 and 4.

TABLE 3

| Remarks | No. | Polymer dispersant | White pigment | Amount of dispersant (wt %) | Amount of wax (wt %) | Viscosity change (mPas) | | Glossiness difference | | Head clogging (failed head nozzles) | |
|---|---|---|---|---|---|---|---|---|---|---|---|
| Example | A-1 | A | 1 | 5.0 | 5.0 | 0.7 | ++ | 3 | ++ | 0 | ++ |
|  | A-2 | A | 2 | 5.0 | 5.0 | 0.6 | ++ | 5 | + | 1 | ++ |
|  | A-3 | A | 3 | 5.0 | 5.0 | 0.4 | ++ | 7 | + | 1 | ++ |
|  | A-4 | A | 4 | 5.0 | 5.0 | 0.3 | ++ | 9 | + | 3 | ++ |
|  | B-1 | B | 1 | 5.0 | 5.0 | 0.8 | ++ | 1 | ++ | 1 | ++ |
|  | B-2 | B | 2 | 5.0 | 5.0 | 0.7 | ++ | 4 | ++ | 1 | ++ |
|  | B-3 | B | 3 | 5.0 | 5.0 | 0.7 | ++ | 5 | + | 4 | ++ |
|  | B-4 | B | 4 | 5.0 | 5.0 | 0.5 | ++ | 8 | + | 5 | + |
|  | C-1 | C | 1 | 5.0 | 5.0 | 0.7 | ++ | 0 | ++ | 0 | ++ |
|  | C-2 | C | 2 | 5.0 | 5.0 | 0.5 | ++ | 2 | ++ | 0 | ++ |
|  | C-3 | C | 3 | 5.0 | 5.0 | 0.5 | ++ | 5 | + | 2 | ++ |
|  | C-4 | C | 4 | 5.0 | 5.0 | 0.3 | ++ | 7 | + | 8 | + |
|  | D-1 | D | 1 | 5.0 | 5.0 | 0.6 | ++ | 0 | ++ | 1 | ++ |
|  | D-2 | D | 2 | 5.0 | 5.0 | 0.4 | ++ | 1 | ++ | 4 | ++ |
|  | D-3 | D | 3 | 5.0 | 5.0 | 0.5 | ++ | 3 | ++ | 5 | + |
|  | D-4 | D | 4 | 5.0 | 5.0 | 0.4 | ++ | 4 | ++ | 6 | + |
| Comparative Example | A-5 | A | 5 | 5.0 | 5.0 | 0.2 | ++ | 14 | − | 35 | − |
|  | A-6 | A | 6 | 5.0 | 5.0 | 0.1 | ++ | 27 | − | 178 | − |
|  | B-5 | B | 5 | 5.0 | 5.0 | 0.4 | ++ | 11 | − | 60 | − |
|  | B-6 | B | 6 | 5.0 | 5.0 | 0.4 | ++ | 17 | − | 335 | − |
|  | C-5 | C | 5 | 5.0 | 5.0 | 0.3 | ++ | 18 | − | 54 | − |
|  | C-6 | C | 6 | 5.0 | 5.0 | 0.1 | ++ | 34 | − | 227 | − |

TABLE 4

| Remarks | No. | Polymer dispersant | White pigment | Amount of dispersant (wt %) | Amount of wax (wt %) | Viscosity change (mPas) | | Glossiness difference | | Head clogging (failed head nozzles) | |
|---|---|---|---|---|---|---|---|---|---|---|---|
| Comparative Example | F-1 | F | 1 | 5.0 | 5.0 | 36.0 | − | 1 | ++ | 24 | − |
|  | F-2 | F | 2 | 5.0 | 5.0 | 25.0 | − | 2 | ++ | 44 | − |
|  | F-3 | F | 3 | 5.0 | 5.0 | 22.0 | − | 5 | + | 78 | − |
|  | F-4 | F | 4 | 5.0 | 5.0 | 18.0 | − | 10 | − | 96 | − |
|  | F-5 | F | 5 | 5.0 | 5.0 | 15.0 | − | 12 | − | 228 | − |
|  | F-6 | F | 6 | 5.0 | 5.0 | 9.0 | + | 18 | − | 987 | − |
|  | G-1 | G | 1 | 5.0 | 5.0 | 0.7 | ++ | 2 | ++ | 34 | − |
|  | G-2 | G | 2 | 5.0 | 5.0 | 30.0 | − | 4 | ++ | 54 | − |
|  | G-3 | G | 3 | 5.0 | 5.0 | 22.0 | − | 5 | + | 69 | − |
|  | G-4 | G | 4 | 5.0 | 5.0 | 14.0 | − | 5 | + | 287 | − |
|  | G-5 | G | 5 | 5.0 | 5.0 | 9.5 | + | 11 | − | 489 | − |
|  | G-6 | G | 6 | 5.0 | 5.0 | 4.5 | + | 16 | − | 774 | − |
|  | H-1 | H | 1 | 5.0 | 5.0 | 24.0 | − | 1 | ++ | 26 | − |
|  | H-2 | H | 2 | 5.0 | 5.0 | 11.0 | − | 3 | ++ | 56 | − |
|  | H-3 | H | 3 | 5.0 | 5.0 | 8.5 | + | 5 | + | 80 | − |
|  | H-4 | H | 4 | 5.0 | 5.0 | 3.3 | + | 6 | + | 117 | − |
|  | H-5 | H | 5 | 5.0 | 5.0 | 1.8 | + | 14 | − | 174 | − |
|  | H-6 | H | 6 | 5.0 | 5.0 | 1.5 | + | 22 | − | 247 | − |
|  | I-1 | I | 1 | 5.0 | 5.0 | 25.0 | − | 4 | ++ | 14 | − |
|  | I-2 | I | 2 | 5.0 | 5.0 | 13.0 | − | 8 | + | 19 | − |
|  | I-3 | I | 3 | 5.0 | 5.0 | 6.7 | + | 11 | − | 36 | − |
|  | I-4 | I | 4 | 5.0 | 5.0 | 4.0 | + | 18 | − | 58 | − |
|  | I-5 | I | 5 | 5.0 | 5.0 | 2.4 | + | 21 | − | 104 | − |
|  | I-6 | I | 6 | 5.0 | 5.0 | 1.7 | + | 26 | − | 133 | − |
|  | J-1 | J | 1 | 5.0 | 5.0 | 14.0 | − | 2 | ++ | 11 | − |
|  | J-2 | J | 2 | 5.0 | 5.0 | 8.0 | + | 5 | + | 18 | − |
|  | J-3 | J | 3 | 5.0 | 5.0 | 3.0 | + | 8 | + | 34 | − |
|  | J-4 | J | 4 | 5.0 | 5.0 | 1.8 | + | 11 | − | 74 | − |
|  | J-5 | J | 5 | 5.0 | 5.0 | 1.2 | + | 15 | − | 98 | − |
|  | J-6 | J | 6 | 5.0 | 5.0 | 1.1 | + | 25 | − | 112 | − |

In the case where the sodium ion content was 200 ppm or less and the dispersant was a comb-shaped block copolymer having a tertiary amine group, the viscosity change and the glossiness difference from other colors were small, and head clogging occurred infrequently.

In the case where the sodium ion content was more than 200 ppm, the glossiness difference from other colors was large. This is presumably because the wax underwent insufficient gelation due to the interaction between the sodium ion and the wax in the inkjet ink, resulting in insufficient pinning, which caused the generation of excessive glossiness. In addition, head clogging occurred frequently in the case where the sodium ion content was more than 200 ppm. This is presumably because a metal salt was formed from the sodium ion and a fatty acid or the like contained in the wax and precipitated.

It was found that, in the case where the dispersant had an amine other than tertiary amines, head clogging occurred frequently, and the ink after storage at a high temperature tended to have increased viscosity. This is presumably because the dispersant was detached from the titanium dioxide pigment at a high temperature due to the weak absorbability of the dispersant to titanium dioxide surface-coated with alumina, resulting in the reagglomeration of the pigment.

In the case where the dispersant had a straight-chain block copolymer, head clogging occurred frequently. This is presumably because the pigment was dispersed insufficiently due to the weak dispersibility of the dispersant.

Example 2

[Preparation of Actinic Radiation-Curable Ink]

An actinic radiation-curable ink was prepared in accordance with the same procedure as in Example 1 by using white pigment dispersion A-2 (dispersant: BYK JET-9151, white pigment: TCR-52) in Example 1. Then, the amount of BYK JET-9151 to be blended as a dispersant and the amounts of KAO Wax T1 (aliphatic ketone) and UNISTAR M222 (fatty acid ester) to be blended as a wax were changed as shown in Tables 5 and 6 to prepare actinic radiation-curable inks K-1 to R-6.

[Inkjet Printing]

By using the same method as in Example 1, a solid image was printed on an OK topcoat (printing sheet) with each ink, and the printed ink was cured by irradiation with an ultraviolet ray.

[Evaluation Method]

(1) Viscosity Change

By using the same method as in Example 1, the viscosities were measured before and after storage in a high-temperature chamber at 85° C. for 1 month, and the viscosity change was evaluated.

(2) Glossiness Difference

By using the same method as in Example 1, reduction of the reflection glossiness value from the average glossiness value of solid images of Yellow, Cyan, and Black (40) was calculated for a solid white image made of each of the actinic radiation-curable inks, and the glossiness difference was evaluated.

(4) Droplet Size

The temperature of a base material for printing was set to 50° C., and an image was formed on the base material at 100% coverage and cured. The image after printing was observed with a microscope (×200), and the droplet size was measured at 10 randomly-selected portions. If the average value of the measurements was 60 μm or larger and 65 μm or smaller, the pinning properties were determined to be satisfactory (denoted as + in Tables 5 and 6), and if the average value was 60 μm or larger and 62 μm or smaller, the pinning properties were determined to be further satisfactory (denoted as ++ in Tables 5 and 6).

The results are shown in Tables 5 and 6.

TABLE 5

| | Ink | | | | Results and evaluation | | | | | |
|---|---|---|---|---|---|---|---|---|---|---|
| No. | Amount of dispersant (wt %) | Amount of aliphatic ketone (wt %) | Amount of fatty acid ester (wt %) | Total amount (wt %) | Viscosity change (mPas) | | Glossiness difference | | Droplet size (μm) | |
| K-1 | 2.0 | 1 | 1 | 2 | 0.7 | ++ | 9 | + | 64 | + |
| K-2 | 5.0 | 1 | 1 | 2 | 0.6 | ++ | 3 | ++ | 63 | + |
| K-3 | 7.0 | 1 | 1 | 2 | 0.3 | ++ | 2 | ++ | 62 | ++ |
| K-4 | 8.0 | 1 | 1 | 2 | 0.4 | ++ | 1 | ++ | 65 | + |
| L-1 | 2.0 | 2 | 1 | 3 | 0.4 | ++ | 5 | + | 65 | + |
| L-2 | 5.0 | 2 | 1 | 3 | 0.3 | ++ | 3 | ++ | 62 | ++ |
| L-3 | 7.0 | 2 | 1 | 3 | 0.3 | ++ | 3 | ++ | 63 | + |
| L-4 | 8.0 | 2 | 1 | 3 | 0.5 | ++ | 7 | + | 66 | − |
| M-1 | 2.0 | 2 | 2 | 4 | 0.8 | ++ | 3 | ++ | 62 | ++ |
| M-2 | 5.0 | 2 | 2 | 4 | 0.5 | ++ | 2 | ++ | 63 | + |
| M-3 | 7.0 | 2 | 2 | 4 | 0.3 | ++ | 2 | ++ | 61 | ++ |
| M-4 | 8.0 | 2 | 2 | 4 | 0.0 | ++ | 4 | + | 62 | ++ |
| N-1 | 2.0 | 3 | 2 | 5 | 0.7 | ++ | 6 | + | 63 | + |
| N-2 | 5.0 | 3 | 2 | 5 | 0.3 | ++ | 5 | + | 62 | ++ |
| N-3 | 7.0 | 3 | 2 | 5 | 0.0 | ++ | 1 | ++ | 63 | + |
| N-4 | 8.0 | 3 | 2 | 5 | 0.2 | ++ | 2 | ++ | 63 | + |
| K-5 | 1.0 | 1 | 1 | 2 | 2.5 | + | 10 | + | 65 | + |
| K-6 | 9.0 | 1 | 1 | 2 | 1.8 | + | 6 | + | 62 | ++ |
| L-5 | 1.0 | 2 | 1 | 3 | 1.3 | + | 9 | + | 64 | + |
| L-6 | 9.0 | 2 | 1 | 3 | 1.7 | + | 11 | − | 65 | + |
| M-5 | 1.0 | 2 | 2 | 4 | 2.4 | + | 5 | + | 63 | + |
| M-6 | 9.0 | 2 | 2 | 4 | 1.4 | + | 8 | + | 63 | + |
| N-5 | 1.0 | 3 | 2 | 5 | 2.9 | + | 10 | + | 64 | + |
| N-6 | 9.0 | 3 | 2 | 5 | 1.5 | + | 4 | + | 61 | ++ |

TABLE 6

| | Ink | | | | Results and evaluation | | | | | |
|---|---|---|---|---|---|---|---|---|---|---|
| No. | Amount of dispersant (wt %) | Amount of aliphatic ketone (wt %) | Amount of fatty acid ester (wt %) | Total amount (wt %) | Viscosity change (mPas) | | Glossiness difference | | Droplet size (μm) | |
| O-1 | 1.0 | 0.5 | 1 | 1.5 | 3.5 | + | 17 | − | 85 | − |
| O-2 | 2.0 | 0.5 | 1 | 1.5 | 0.8 | ++ | 16 | − | 82 | − |
| O-3 | 5.0 | 0.5 | 1 | 1.5 | 0.5 | ++ | 11 | − | 89 | − |
| O-4 | 7.0 | 0.5 | 1 | 1.5 | 0.3 | ++ | 14 | − | 80 | − |
| O-5 | 8.0 | 0.5 | 1 | 1.5 | 0.4 | ++ | 25 | − | 84 | − |
| O-6 | 9.0 | 0.5 | 1 | 1.5 | 6.0 | + | 29 | − | 84 | − |
| P-1 | 1.0 | 1 | 0.5 | 1.5 | 5.7 | + | 22 | − | 72 | − |
| P-2 | 2.0 | 1 | 0.5 | 1.5 | 0.9 | ++ | 19 | − | 75 | − |
| P-3 | 5.0 | 1 | 0.5 | 1.5 | 0.6 | ++ | 15 | − | 77 | − |
| P-4 | 7.0 | 1 | 0.5 | 1.5 | 0.6 | ++ | 17 | − | 76 | − |
| P-5 | 8.0 | 1 | 0.5 | 1.5 | 0.4 | ++ | 16 | − | 75 | − |
| P-6 | 9.0 | 1 | 0.5 | 1.5 | 0.8 | ++ | 21 | − | 73 | − |
| Q-1 | 1.0 | 2 | 3 | 5 | 4.5 | + | 11 | − | 65 | + |
| Q-2 | 2.0 | 2 | 3 | 5 | 1.8 | + | 9 | + | 65 | + |
| Q-3 | 5.0 | 2 | 3 | 5 | 1.4 | + | 5 | + | 63 | + |
| Q-4 | 7.0 | 2 | 3 | 5 | 1.1 | + | 5 | + | 64 | + |
| Q-5 | 8.0 | 2 | 3 | 5 | 1.3 | + | 6 | + | 63 | + |
| Q-6 | 9.0 | 2 | 3 | 5 | 2.5 | + | 8 | + | 62 | ++ |
| R-1 | 1.0 | 3 | 3 | 6 | 9.8 | + | 10 | + | 63 | + |
| R-2 | 2.0 | 3 | 3 | 6 | 5.4 | + | 5 | + | 63 | + |
| R-3 | 5.0 | 3 | 3 | 6 | 3.2 | + | 3 | ++ | 64 | + |
| R-4 | 7.0 | 3 | 3 | 6 | 3.7 | + | 4 | + | 62 | ++ |
| R-5 | 8.0 | 3 | 3 | 6 | 4.4 | + | 5 | + | 63 | + |
| R-6 | 9.0 | 3 | 3 | 6 | 6.8 | + | 7 | + | 62 | ++ |

In the case where the content of the copolymer according to one aspect of the present invention was 2.0 mass % or more and 8.0 mass % or less relative to the total mass of the ink, the viscosity change was smaller. This is presumably because controlling the content of the copolymer according to one aspect of the present invention within the range allowed the pigment to be sufficiently dispersed, and the increase of the viscosity due to entangling of the dispersant did not occur.

In the case where the sum total of the content of the aliphatic ketone and the content of the fatty acid ester was 2.0 mass % or more relative to the total mass of the ink, the glossiness difference was smaller and the droplet size was in a further satisfactory range. This is presumably because the presence of the wax in an adequate amount allowed the ink to undergo sufficient gelation and pinning. In the case where the sum total of the content of the aliphatic ketone and the content of the fatty acid ester was 5.0 mass % or less relative to the total mass of the ink, the viscosity change was smaller.

INDUSTRIAL APPLICABILITY

The actinic radiation-curable inkjet white ink according to one aspect of the present invention can be used as, for example, inks for top coating or primer coating in formation of an image using other color inks.

This application is entitled to and claims the benefit of Japanese Patent Application No. 2014-080972, filed on Apr. 10, 2014. The contents of the specification and drawings of this application are incorporated herein by reference in its entirety.

REFERENCE SIGNS LIST

10, 20 Inkjet recording apparatus
12 Recording medium
14, 24 Recording head for ink discharge
16, 26 Head carriage
18, 28 Light irradiation section
19 Temperature control section
27 Guide section

The invention claimed is:

1. An actinic radiation-curable inkjet white ink capable of sol-gel phase transition through a temperature change, comprising a pigment, a dispersant, a wax, a photocurable compound, and a photopolymerization initiator, wherein
the pigment comprises titanium dioxide surface-coated with alumina,
a content of the titanium dioxide is 10 mass % or more and 15 mass % or less relative to a total mass of the ink,
the ink comprises a sodium ion at a mass fraction of 200 ppm or less relative to a mass of the pigment, and
the dispersant comprises a comb-shaped block copolymer having a tertiary amine group.

2. The ink according to claim 1, wherein a content of the block copolymer is 2.0 mass % or more and 8.0 mass % or less relative to the total mass of the ink.

3. The ink according to claim 1, wherein the wax comprises an aliphatic ketone and a fatty acid ester.

4. The ink according to claim 3, wherein a sum total of a content of the aliphatic ketone and a content of the fatty acid ester is 2.0 mass % or more and 5.0 mass % or less relative to the total mass of the ink.

5. The ink according to claim 3, wherein a content of the aliphatic ketone is equal to or more than a content of the fatty acid ester.

6. An image forming method comprising: attaching the actinic radiation-curable inkjet white ink according to claim 1 onto a recording medium through discharge from a recording head for ink discharge; and irradiating the attached actinic radiation-curable inkjet white ink with actinic radiation.

7. The image forming method according to claim 6, further comprising: attaching one or more color ink(s) onto the recording medium; and fixing the attached color ink(s).

8. The method according to claim 7, wherein the attaching the actinic radiation-curable inkjet white ink onto the recording medium is performed after the attaching the color ink(s) onto the recording medium.

9. The method according to claim 7, wherein the attaching the color ink(s) onto the recording medium is performed after the attaching the actinic radiation-curable inkjet white ink onto the recording medium.

10. The method according to claim 7, wherein the color ink(s) is or are each an actinic radiation-curable ink comprising a photocurable compound and a photopolymerization initiator, the fixing the attached color ink(s) corresponds to irradiating the attached color ink(s) with actinic radiation, and the irradiating the attached color ink(s) with actinic radiation and the irradiating the attached actinic radiation-curable inkjet white ink with actinic radiation are performed by one irradiation with actinic radiation.

* * * * *